US012798459B2

(12) United States Patent
Mukuta et al.

(10) Patent No.: US 12,798,459 B2
(45) Date of Patent: Nov. 17, 2026

(54) HEAD REST

(71) Applicant: TACHI-S CO., LTD., Tokyo (JP)

(72) Inventors: Masanobu Mukuta, Tokyo (JP); Yousuke Noguchi, Tokyo (JP)

(73) Assignee: TACHI-S CO., LTD., Tokyo (JP)

(*) Notice: Subject to any disclaimer, the term of this patent is extended or adjusted under 35 U.S.C. 154(b) by 122 days.

(21) Appl. No.: 18/943,959

(22) Filed: Nov. 12, 2024

(65) Prior Publication Data

US 2025/0153625 A1 May 15, 2025

(30) Foreign Application Priority Data

Nov. 13, 2023 (JP) ................................ 2023-193153

(51) Int. Cl.
*B60N 2/865* (2018.01)

(52) U.S. Cl.
CPC .................................... *B60N 2/865* (2018.02)

(58) Field of Classification Search
CPC ......... B60N 2/865; B60N 2/815; B60N 2/818
USPC ........................................................ 297/391
See application file for complete search history.

(56) References Cited

U.S. PATENT DOCUMENTS 4,856,848 A * 8/1989 O'Sullivan ............ B60N 2/865 297/391
5,054,856 A * 10/1991 Wang ..................... B60N 2/853 297/409
7,631,932 B2 * 12/2009 Hoffmann .............. B60N 2/865 297/216.12
8,240,756 B2 * 8/2012 Hartlaub ................ B60N 2/888 297/216.12
8,517,471 B2 * 8/2013 Maddelein ............. B60N 2/865 297/410
8,616,633 B2 * 12/2013 Truckenbrodt ........ B60N 2/865 297/216.12
8,714,650 B2 * 5/2014 Sobieski ................ B60N 2/865 297/391
8,814,227 B2 * 8/2014 Wallinger .............. B60N 2/919 292/200

(Continued)

FOREIGN PATENT DOCUMENTS

| | | |
|---|---|---|
| DE | 102007002615 B3 | 2/2008 |
| KR | 10-2122712 B1 | 6/2020 |
| WO | WO 2020/179965 A1 | 9/2020 |

*Primary Examiner* — Timothy D Collins
*Assistant Examiner* — Maria E Graber
(74) *Attorney, Agent, or Firm* — Paratus Law Group, PLLC.

(57) ABSTRACT

A head rest includes a stay supported by a seat back of a vehicle seat, a support unit supported by the stay, and a movable unit being movable in a front-rear direction of the vehicle seat with respect to the support unit. The movable unit includes first and second accommodation members that form a space for accommodating the support unit and are provided side by side in the front-rear direction, and a first guide member that is formed in a columnar shape extending in the front-rear direction from the first accommodation member or the second accommodation member in the space. The support unit has a first guide hole through which the first guide member is slidably inserted to guide a movement of the movable unit in the front-rear direction. A part of an inner wall surface of the first guide hole is configured to be elastically deformed.

7 Claims, 22 Drawing Sheets

(56) References Cited

U.S. PATENT DOCUMENTS

| | | | | |
|---|---|---|---|---|
| 8,814,265 | B2 * | 8/2014 | Froese | B60N 2/865<br>297/216.12 |
| 9,096,155 | B2 * | 8/2015 | Reel | B60N 2/865 |
| 9,114,744 | B2 * | 8/2015 | Groenninger | B60N 2/812 |
| 10,160,361 | B2 * | 12/2018 | Little | B60N 2/02246 |
| 10,293,727 | B2 * | 5/2019 | Tatewaki | B60N 2/865 |
| 10,427,573 | B2 * | 10/2019 | Ishihara | B60N 2/829 |
| 10,500,997 | B2 * | 12/2019 | Maloney | B60N 2/829 |
| 10,821,869 | B2 * | 11/2020 | Jiang | B60N 2/865 |
| 10,974,632 | B2 * | 4/2021 | Jeong | A47C 7/38 |
| 10,994,641 | B2 * | 5/2021 | Kang | B60N 2/868 |
| 11,613,192 | B2 * | 3/2023 | Morilhat | B60N 2/865<br>297/410 |
| 2010/0026061 | A1 * | 2/2010 | McFalls | B60N 2/865<br>297/216.12 |
| 2012/0080925 | A1 * | 4/2012 | Steinmetz | B60N 2/815<br>297/391 |
| 2012/0126605 | A1 * | 5/2012 | Gross | B60N 2/865<br>297/410 |
| 2013/0002000 | A1 * | 1/2013 | Delling | B60N 2/865<br>297/391 |
| 2013/0049428 | A1 * | 2/2013 | Reel | B60N 2/865<br>297/391 |
| 2013/0229042 | A1 * | 9/2013 | Kotz | B60N 2/888<br>297/391 |
| 2013/0234491 | A1 * | 9/2013 | Schmitz | B60N 2/841<br>297/391 |
| 2014/0028071 | A1 * | 1/2014 | Gunther | B60N 2/847<br>297/391 |
| 2014/0197671 | A1 * | 7/2014 | Frotz | B60N 2/865<br>297/391 |
| 2014/0339875 | A1 * | 11/2014 | Sunaga | B60N 2/847<br>297/391 |
| 2015/0115681 | A1 * | 4/2015 | Reel | B60N 2/865<br>297/391 |
| 2015/0251574 | A1 * | 9/2015 | Ishihara | B60N 2/818<br>297/391 |
| 2021/0155134 | A1 * | 5/2021 | Mihm | B60N 2/876 |
| 2025/0162481 | A1 * | 5/2025 | Shin | B60N 2/865 |

* cited by examiner

HEAD REST

CROSS-REFERENCE TO RELATED APPLICATIONS

This application is based on and claims priority under 35 USC 119 from Japanese Patent Application No. 2023-193153 filed on Nov. 13, 2023, the entire content of which is incorporated herein by reference.

TECHNICAL FIELD

The present disclosure relates to a head rest.

BACKGROUND ART

KR10-2122712B and DE102007002615B disclose a head rest in which a part of an outer cover is movable in a front-rear direction of a seat.

An object of the present disclosure is to provide a head rest capable of smoothly moving a movable unit of the head rest.

SUMMARY OF INVENTION

According to an aspect of the present disclosure, there is provided a head rest that includes: a stay supported by a seat back of a vehicle seat; a support unit supported by the stay; and a movable unit configured to be allowed to move in a front-rear direction of the vehicle seat with respect to the support unit. The movable unit includes a first accommodation member and a second accommodation member that form a space for accommodating the support unit and are provided side by side in the front-rear direction, and a first guide member that is formed in a columnar shape extending in the front-rear direction from the first accommodation member or the second accommodation member in the space. The support unit has a first guide hole through which the first guide member is slidably inserted to guide a movement of the movable unit in the front-rear direction. A part of an inner wall surface of the first guide hole is configured to be elastically deformed.

BRIEF DESCRIPTION OF DRAWINGS

Exemplary embodiment(s) of the present invention will be described in detail based on the following figures, wherein.

DESCRIPTION OF EMBODIMENTS

Figure 1:
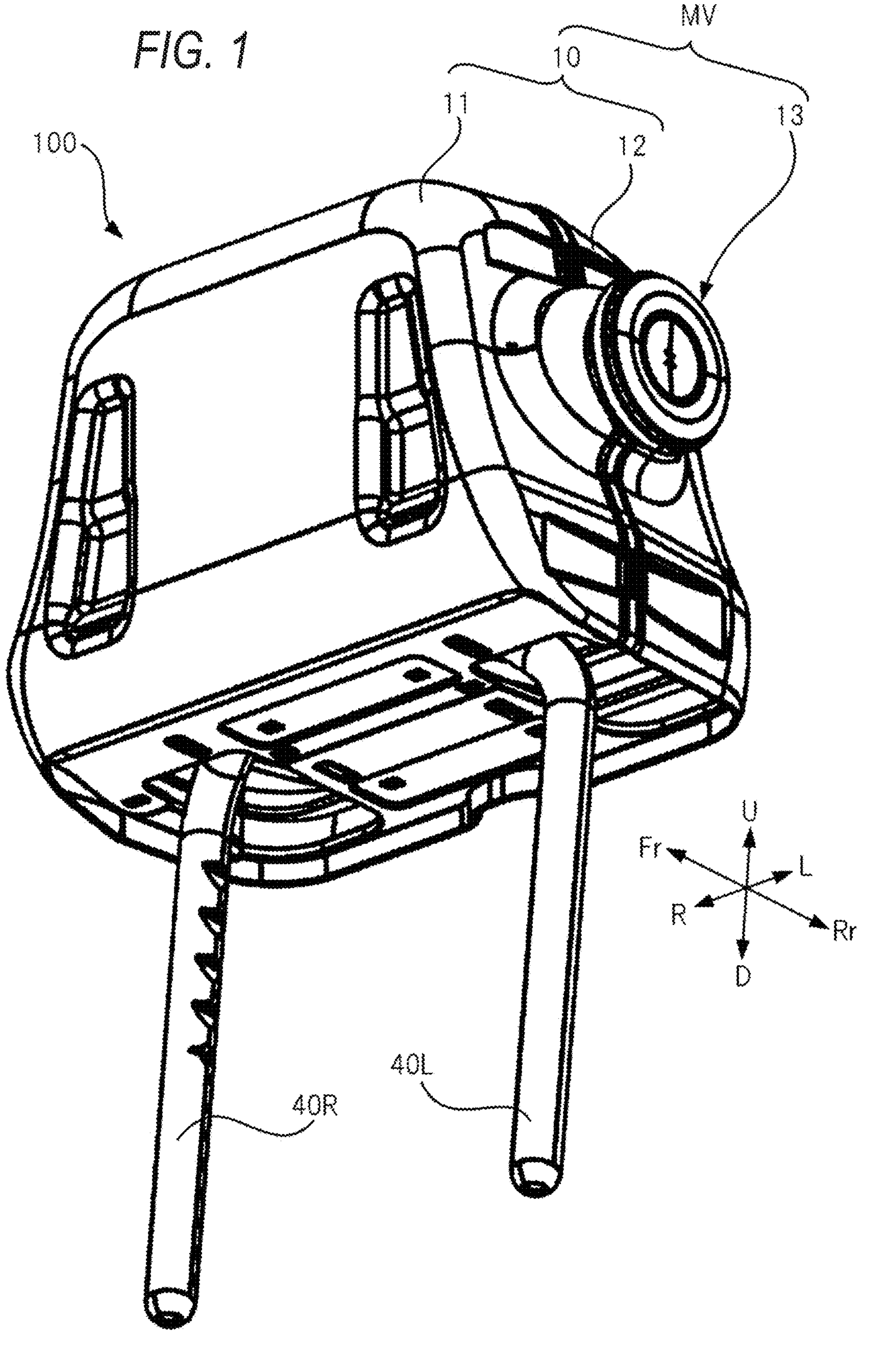
FIG. 1 is an external perspective view showing a schematic configuration of a head rest 100 according to an embodiment of the technique of the present disclosure.
Figure 2:
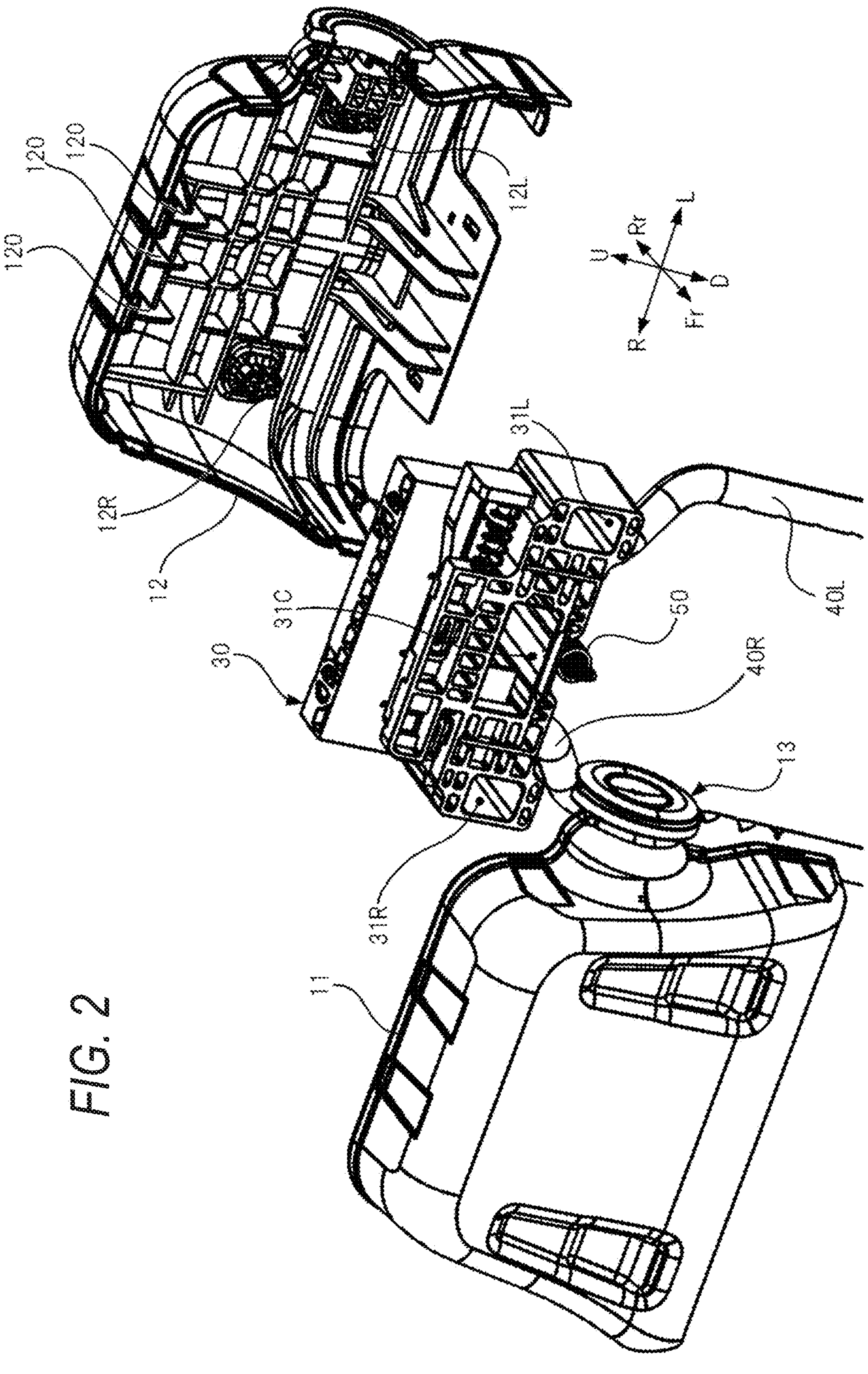
FIG. 2 is an exploded perspective view of the head rest 100 shown in FIG. 1.
Figure 3:
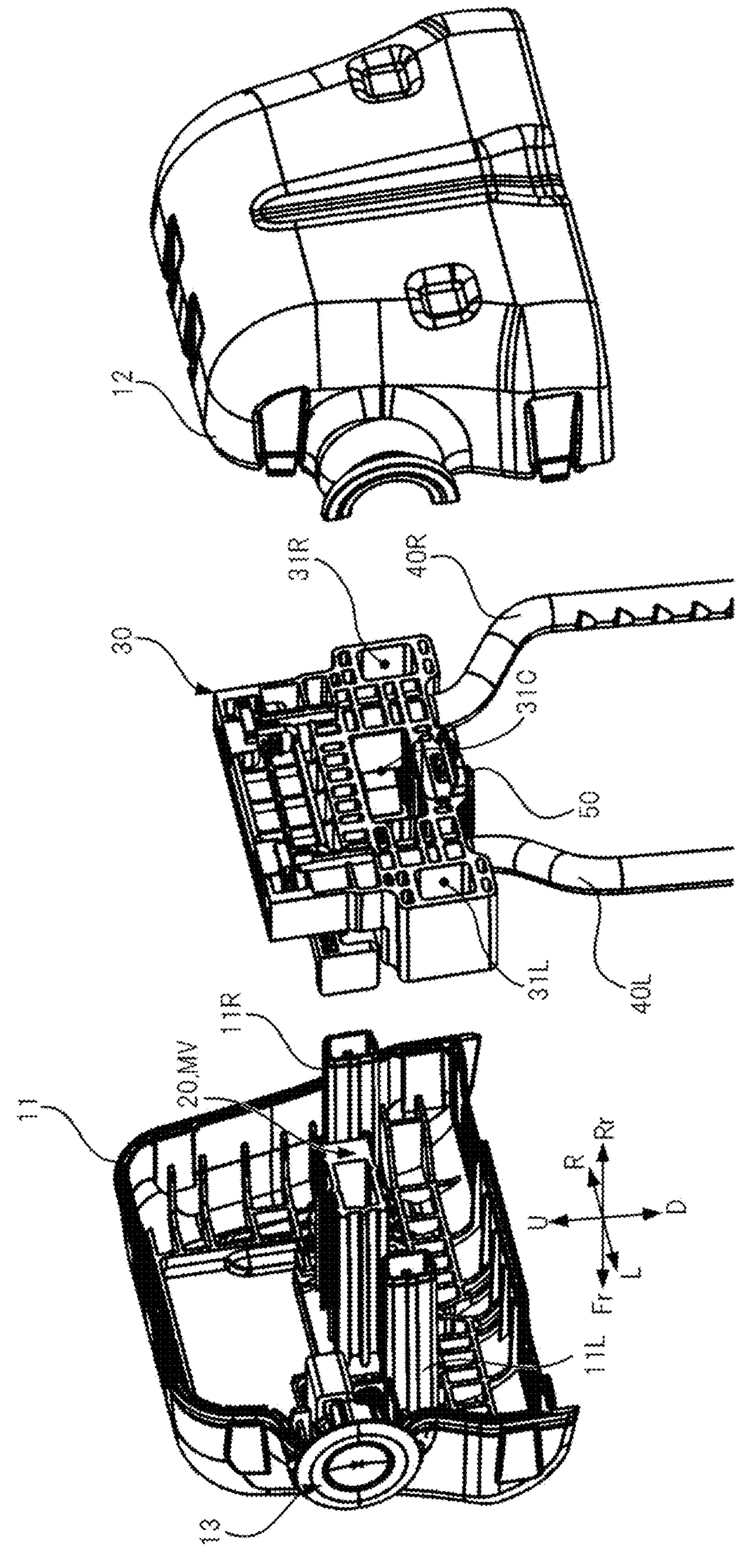
FIG. 3 is an exploded perspective view of the head rest 100 shown in FIG. 1 when viewed from another direction.

FIG. 1 is an external perspective view showing a schematic configuration of a head rest 100 according to an embodiment of the technique of the present disclosure. FIG. 2 is an exploded perspective view of the head rest 100 shown in FIG. 1. FIG. 3 is an exploded perspective view of the head rest 100 shown in FIG. 1 when viewed from another direction. The head rest 100 shown in FIG. 1 shows a state where a pad as a buffer member and a trim cover as a cover covering the pad are removed.

In the following description, a front side of an occupant who sits in a normal posture on a vehicle seat to which the head rest 100 is attached is referred to as a frontward direction Fr, a direction opposite to the frontward direction Fr is referred to as a rearward direction Rr, and the frontward and rearward directions are collectively referred to as a front-rear direction of the vehicle seat. A right side of the occupant when the occupant is viewed from a rear side is referred to as a rightward direction R, a left side of the occupant is referred to as a leftward direction L, and the left and right directions are collectively referred to as a left-right direction of the vehicle seat. A direction perpendicular to the front-rear direction and the left-right direction and extending from the head rest 100 toward a seating surface is referred to as a downward direction D, a direction opposite to the downward direction D is referred to as an upward direction U, and the upward and downward directions are collectively referred to as an up-down direction of the vehicle seat. The front-rear direction, the left-right direction, and the up-down direction intersect with each other. The left-right direction constitutes a first direction. The up-down direction constitutes a specific direction.

Overall Configuration

The head rest 100 is connected to an upper end portion of a seat back of a vehicle seat and supports the rear of a head of an occupant. Examples of the vehicle include an automobile, an aircraft, a train, a drone, or a ship. The head rest 100 includes a right stay 40R and a left stay 40L that are disposed at intervals in the left-right direction, a support unit 30 supported by the right stay 40R and the left stay 40L, a movable unit MV that is configured to be allowed to move in the front-rear direction with respect to the support unit 30, and a tension coil spring 50 as an elastic member that connects the support unit 30 and the movable unit MV. The right stay 40R and the left stay 40L are made of, for example, metal frames, lower end portions of the right stay 40R and the left stay 40L are inserted into the upper end portion of the seat back of the vehicle seat, and are supported by the seat back. The right stay 40R constitutes a first stay, and the left stay 40L constitutes a second stay. Although details will be described later, the support unit 30 includes a central guide hole 31C, a right guide hole 31R, and a left guide hole 31L that penetrate in the front-rear direction.

<Movable Unit>

The movable unit MV includes: an accommodation member 10 including a front cover 11 and a rear cover 12 that are provided side by side in the front-rear direction and form a space for accommodating the support unit 30; an operation button 13 that is attached to a left side of the front cover 11; and a central guide member 20 that is formed in a columnar shape extending in the rearward direction Rr from a front portion of the front cover 11 and is detachably attached to the front cover 11.

The front cover 11 and the rear cover 12 are provided to sandwich the support unit 30 in the front-rear direction, and the front cover 11 is provided on a front side of the rear cover 12. The front cover 11 and the rear cover 12 are fixed to each other by fitting or the like using an engagement tab. The front cover 11 and the rear cover 12 are made of, for example, a resin molded product. The front cover 11 constitutes a first accommodation member, the rear cover 12 constitutes a second accommodation member, the operation button 13 constitutes an operation unit, and the central guide member 20 constitutes a first guide member or an engagement member.

The central guide member 20 extends in the rearward direction Rr from central portions of the front cover 11 in the up-down direction and the left-right direction. A columnar right guide member 11R and a columnar left guide member 11L are further provided on an inner surface of the front cover 11 to extend toward the rear cover 12.

Figure 14:
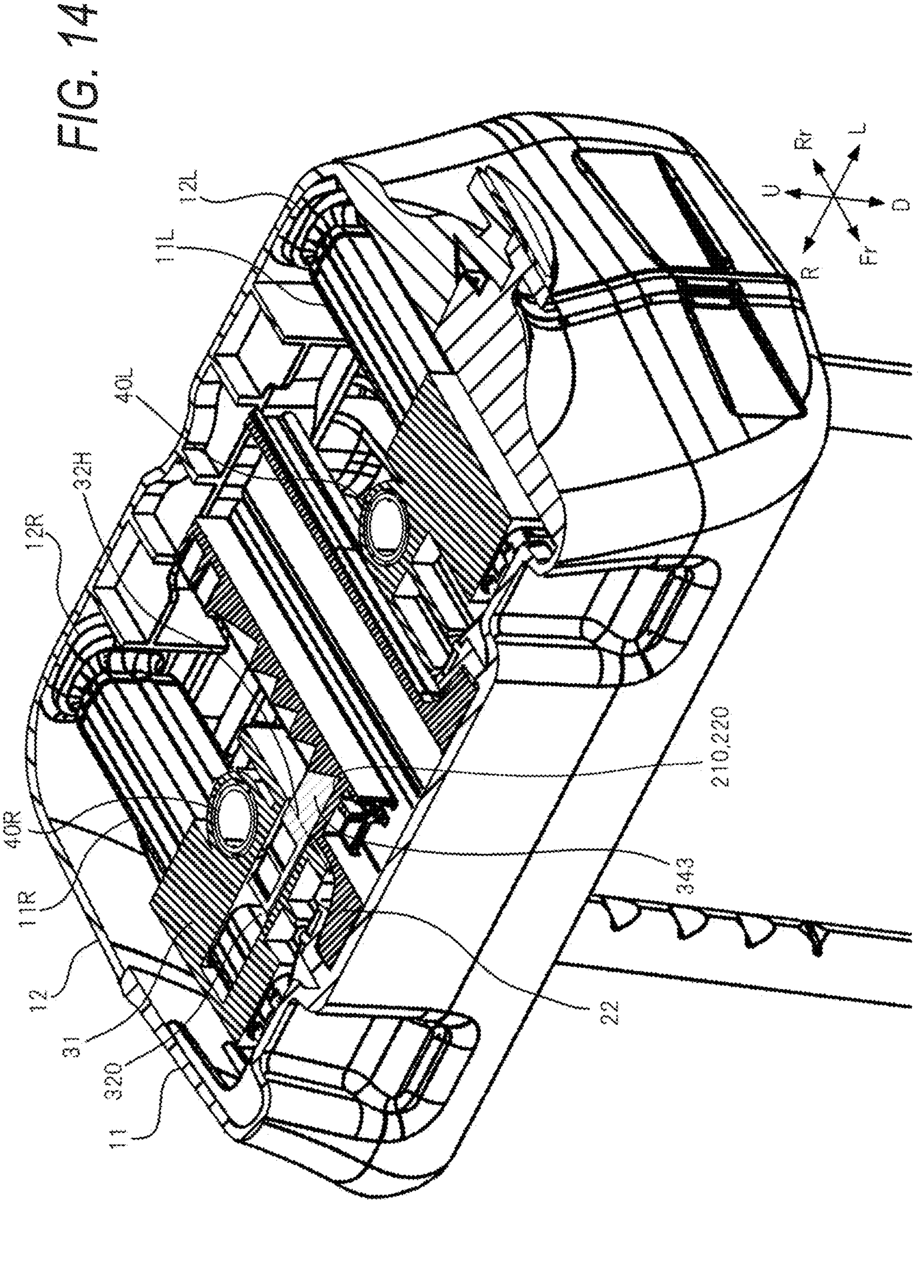
FIG. 14 shows a cross section perpendicular to an up-down direction of the head rest 100, and is a schematic view of a cross section passing through an axis of the central guide member 20.

The right guide member 11R is provided on a right side and a lower side of the central guide member 20. The left guide member 11L is provided on a left side and the lower side of the central guide member 20. The right guide member 11R and the left guide member 11L are provided side by side in the left-right direction. As shown in FIG. 14, the right guide member 11R has an opening on a rear end surface, and the opening is fitted to a connecting projection portion 12R provided on an inner surface of the rear cover 12. The left guide member 11L has an opening on a rear end surface, and the opening is fitted to a connecting projection portion 12L provided on the inner surface of the rear cover 12. The right guide member 11R and the left guide member 11L constitute a second guide member.

The central guide member 20, the right guide member 11R, and the left guide member 11L have a function of guiding a movement of the movable unit MV when the movable unit MV moves in the front-rear direction. The central guide member 20 is slidably inserted into the central guide hole 31C of the support unit 30. The right guide member 11R is slidably inserted into the right guide hole 31R of the support unit 30. The left guide member 11L is slidably inserted into the left guide hole 31L of the support unit 30. The movement of the movable unit MV in the front-rear direction is guided by the sliding of the central guide member 20, the right guide member 11R, the left guide member 11L, the central guide hole 31C, the right guide hole 31R, and the left guide hole 31L.

The right guide member 11R and the left guide member 11L are formed integrally with the front cover 11. On the other hand, the central guide member 20 is formed separately from the front cover 11. The central guide member 20 is preferably configured to have higher rigidity than the accommodation member 10. Since the central guide member 20 is separate from the front cover 11, the optimum strength and material can be determined for each of the central guide member 20 and the front cover 11, so that a manufacturing cost of the head rest 100 can be reduced.

Figure 4:
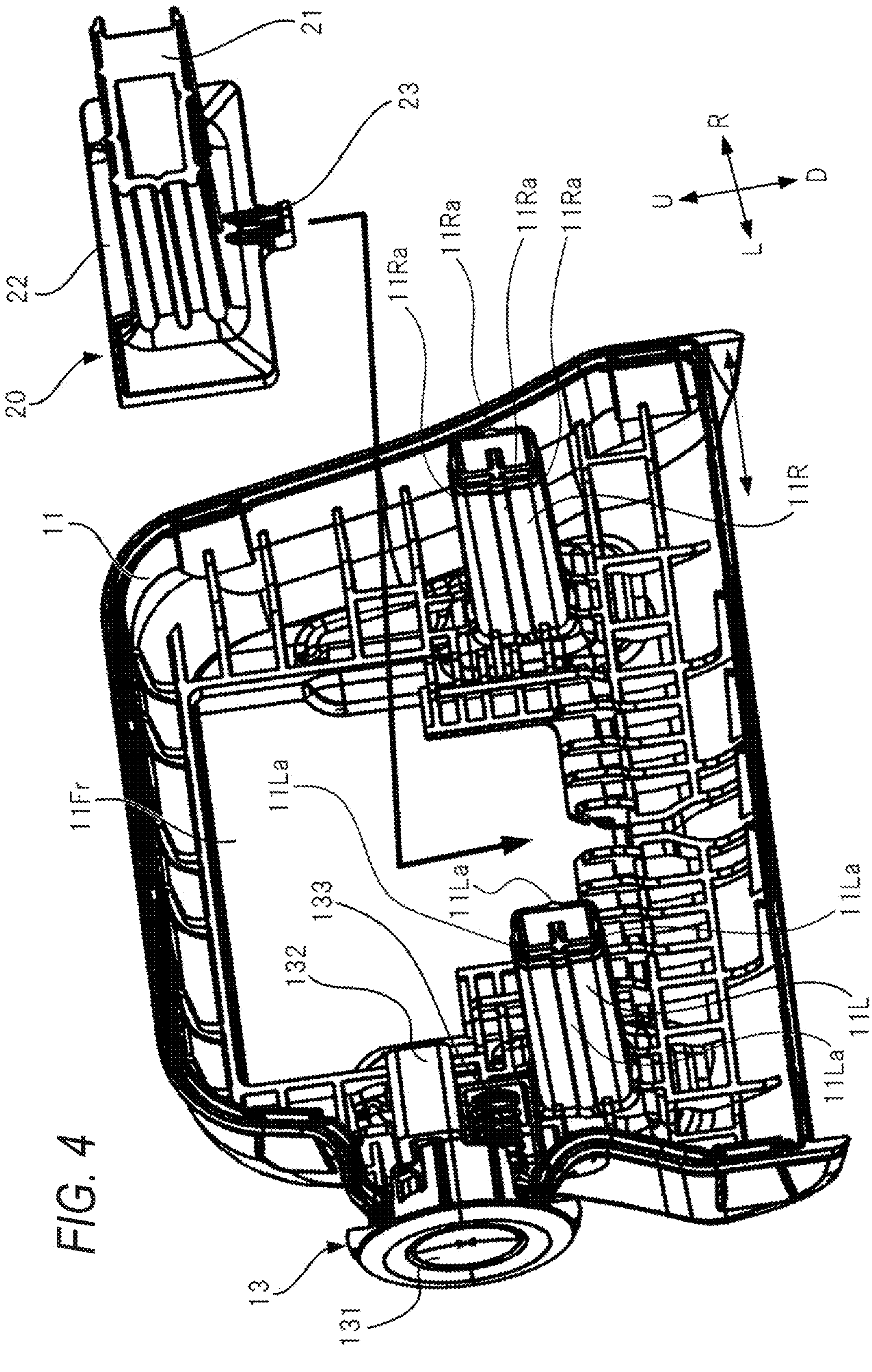
FIG. 4 is a view showing a front cover 11, an operation button 13, and a central guide member 20 of the head rest 100, and is a perspective view showing a state where the central guide member 20 is not attached to the front cover 11.
Figure 5:
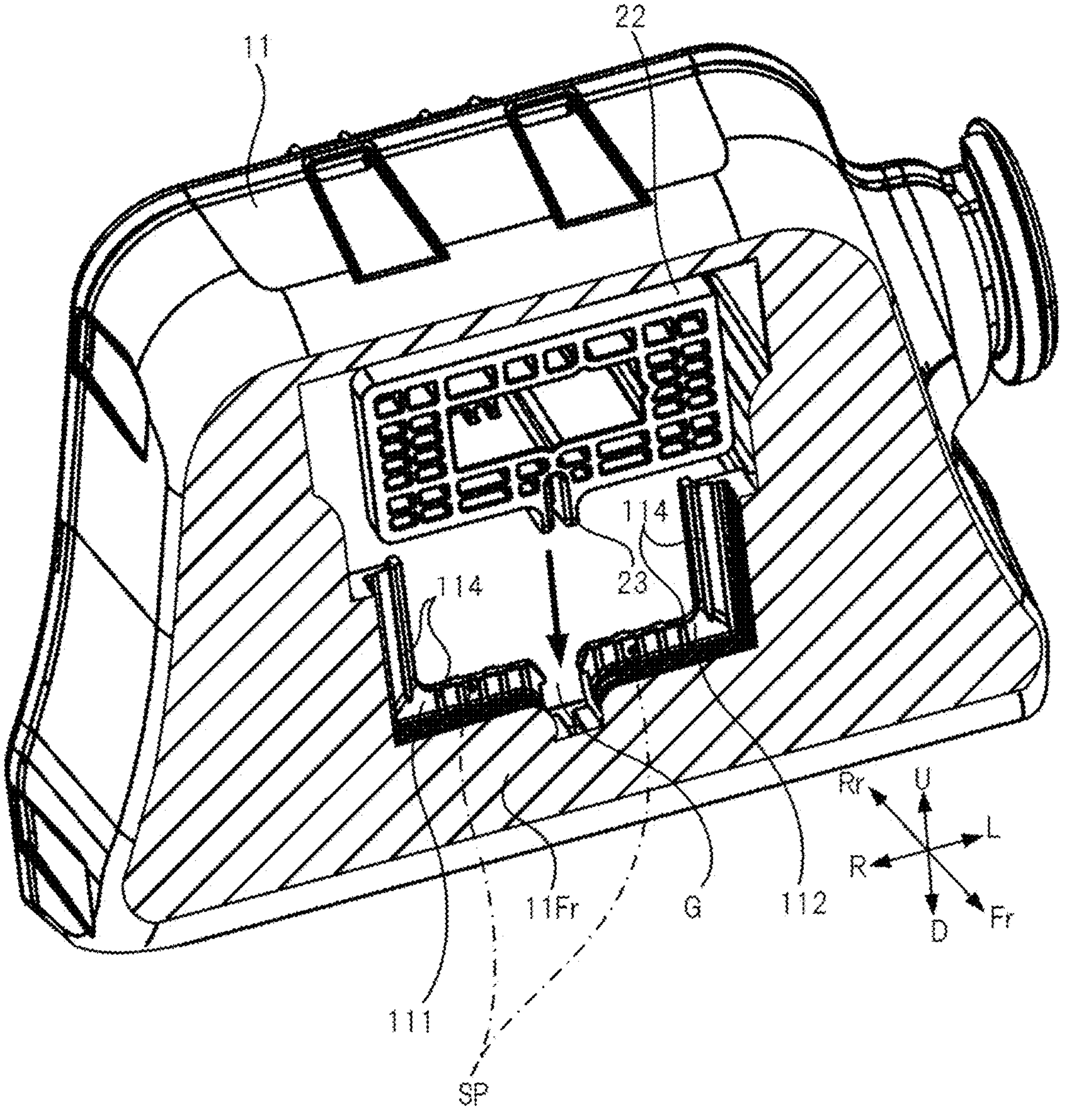
FIG. 5 is a cross-sectional view of a front portion of the front cover 11 taken along a plane perpendicular to a front-rear direction in FIG. 4.

FIG. 4 is a view showing the front cover 11, the operation button 13, and the central guide member 20 of the head rest 100, and is a perspective view showing a state where the central guide member 20 is not attached to the front cover 11. FIG. 5 is a cross-sectional view of a front portion of the front cover 11 taken along a plane perpendicular to the front-rear direction in FIG. 4. The hatched region in FIG. 5 is shown in a simplified manner, and illustration of a recess provided in the front cover 11, a rib for improving strength, or the like is omitted.

As shown in FIG. 4, the central guide member 20 includes a square column shaped main body portion 21 extending in the rearward direction Rr, a flange portion 22 provided at a front end of the main body portion 21, and a protrusion portion 23 protruding in the downward direction D from substantially the center of a lower end of the flange portion 22 in the left-right direction.

As shown in FIG. 5, in the front portion of the front cover 11, a space SP for receiving the flange portion 22 of the central guide member 20 is provided substantially at the center in the left-right direction and the up-down direction. The front cover 11 is provided with a front cover wall portion 111 having an L shape as viewed in the front-rear direction to be rearwardly spaced apart from a front surface 11Fr, and a right end edge and a lower end edge of the front cover wall portion 111 are connected to the front surface 11Fr. In addition, the front cover 11 is provided with a front cover wall portion 112 having an inverted L-shape obtained by horizontally inverting the front cover wall portion 111 to be rearwardly spaced apart from front surface 11Fr, and a left end edge and a lower end edge of the front cover wall portion 112 are connected to the front surface 11Fr. The space SP is defined by a portion connecting the front cover wall portion 111 and the front surface 11Fr, a space surrounded by the front cover wall portion 111 and the front surface 11Fr, a portion connecting the front cover wall portion 112 and the front surface 11Fr, and a space surrounded by the front cover wall portion 112 and the front surface 11Fr.

When the central guide member 20 is attached to the front cover 11, the flange portion 22 is inserted into the space SP from above to below the space SP. Accordingly, a part of the flange portion 22 is engaged with the front cover 11, and a right end portion, a left end portion, and a lower end portion are held between the front cover wall portion 111 and the front cover wall portion 112 and the front surface 11Fr, and the movement in the front-rear direction is firmly restricted. As a result, the central guide member 20 can be stably supported by the front cover 11 even when the movable unit MV moves in the front-rear direction or when an impact is applied to the head rest 100 in the front-rear direction.

A portion of the front cover 11 (the front cover wall portion 111, the front cover wall portion 112, the front surface 11Fr, and a side portion connecting the front cover wall portion 111 and the front cover wall portion 112 to the front surface 11Fr) that forms the space SP constitutes a support portion that supports the central guide member 20 in a state where a portion of a proximal portion of the central guide member 20 on a front cover 11 side is sandwiched in the front-rear direction.

Thus, since the central guide member 20 can be supported by the front cover 11 by the partial engagement of the flange portion 22 and the support portion in the up-down direction, the central guide member 20 can be easily assembled to the front cover 11. In the front cover 11, a thickness of the front portion is different from thicknesses of the left portion and the right portion. Specifically, the thickness of the front portion of the front cover 11 is larger than the thicknesses of the left portion and the right portion. In the front cover 11, the thickness of the front portion supporting the central guide member 20 is larger than that of the other portion. Therefore, even when an external impact is applied to the front portion, the support of the central guide member 20 can be maintained, and the durability can be improved. The left portion and the right portion of the front cover 11 constitute a first region, and the front portion of the front cover 11 constitutes a second region.

Figure 6:
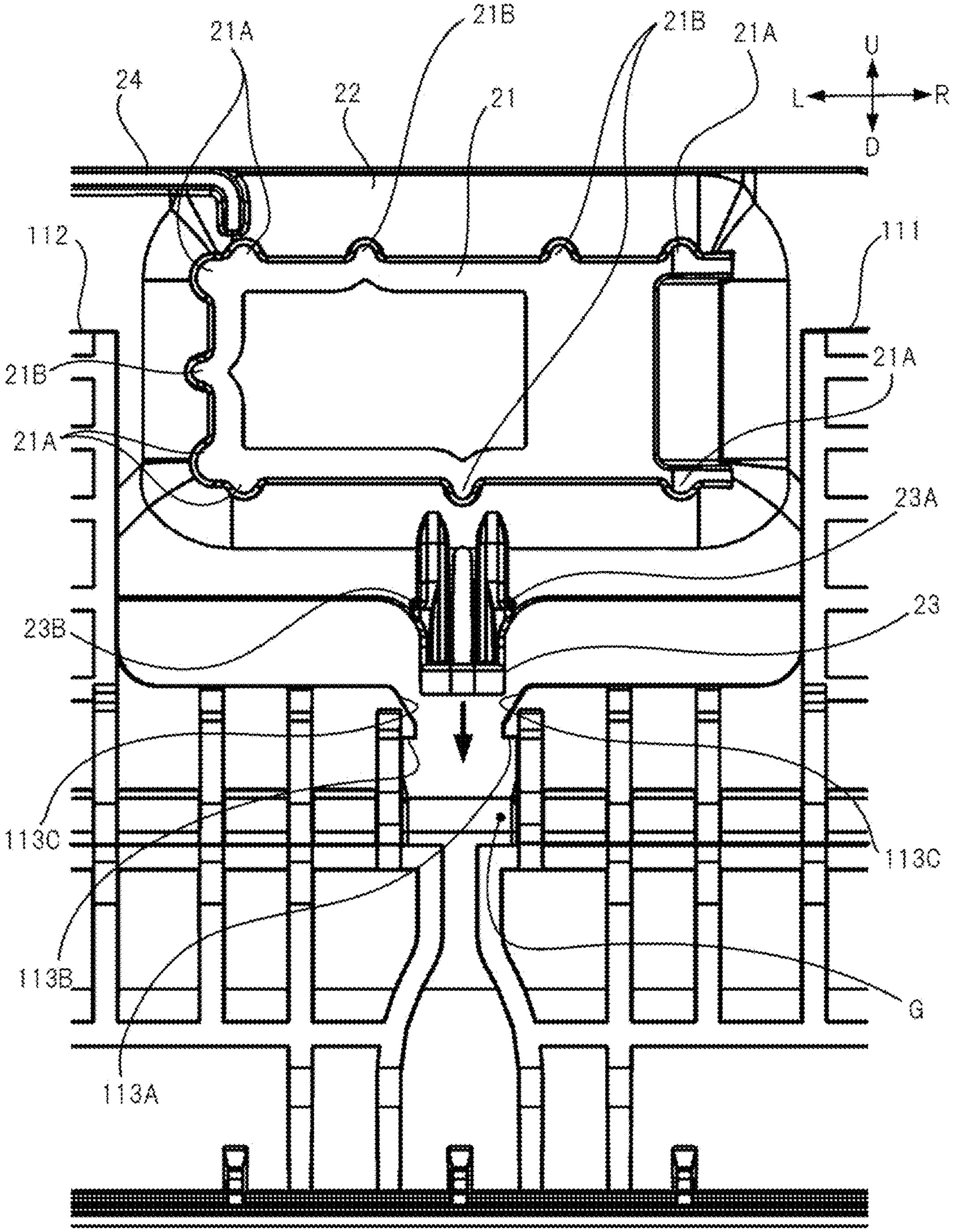
FIG. 6 is an enlarged view of a state where a flange portion 22 is being engaged with the front cover 11 when viewed from a rear side.

FIG. 6 is an enlarged view of a state where the flange portion 22 is being engaged with the front cover 11 when viewed from a rear side. A gap G constituting an insertion portion into which the protrusion portion 23 of the central guide member 20 is inserted is provided between the front cover wall portion 111 and the front cover wall portion 112. A trapezoidal projection portion 113A that protrudes toward the front cover wall portion 112 is provided at the top of an end of the front cover wall portion 111 facing the front cover wall portion 112. A trapezoidal projection portion 113B that protrudes toward the front cover wall portion 111 is provided at the top of an end of the front cover wall portion 112 facing the front cover wall portion 111. The projection portion 113A and the projection portion 113B have a guide shape inclined surface 113C that assists the insertion of the protrusion portion 23 into the gap G. The gap G is formed by the projection portion 113A and the projection portion 113B so that an entrance thereof becomes narrower toward the lower side.

The protrusion portion 23 of the central guide member 20 is provided with an engagement projection portion 23A protruding in the rightward direction R on a right side surface of an end on a flange portion 22 side, and an engagement projection portion 23B protruding in the leftward direction L on a left side surface of the end on the flange portion 22 side. When the flange portion 22 is engaged with the front cover 11, the engagement projection portion 23A and the engagement projection portion 23B come into contact with the inclined surface 113C and move in the downward direction D along the inclined surface 113C. Thereafter, when the engagement projection portion 23A and the engagement projection portion 23B move to the lower side beyond the projection portion 113A and the projection portion 113B, the engagement projection portion 23A is engaged with the projection portion 113A and the engagement projection portion 23B is engaged with the projection portion 113B, and the movement of the central guide member 20 in the up-down direction is firmly restricted. The click feeling can be given by this engagement, and the central guide member 20 can be efficiently assembled to the front cover 11. The engagement projection portion 23A and the engagement projection portion 23B constitute an engaged portion, and the projection portion 113A and the projection portion 113B constitute an engaging portion that engages with the engaged portion. A position of the central guide member 20 in the up-down direction is determined by a rib 24 provided at a left end of an upper end portion of the flange portion 22 coming into contact with the front cover wall portion 112.

As shown in FIG. 5, a plurality of linear first projection portions 114 each having a curved surface extending in the up-down direction are provided on front surfaces (surfaces facing the flange portions 22) of the front cover wall portion 111 and the front cover wall portion 112 in the shown example. A cross-sectional shape of the surface of each of the first projection portions 114 is, for example, an arc shape. The flange portion 22 engages with the front cover 11 while sliding in contact with the first projection portion 114. Since the resistance during the sliding of the central guide member 20 is reduced by the first projection portion 114, the central guide member 20 can be easily attached to the front cover 11. Since contact areas between the front cover wall portion 111 and the front cover wall portion 112 and the flange portion 22 can be reduced by the first projection portion 114, manufacturing variations of the front cover 11 and the central guide member 20 can be absorbed.

The movable unit MV is configured to be held at a plurality of positions in the front-rear direction by a lock member 34 (see FIG. 8) included in the support unit 30. The operation button 13 provided in the movable unit is an operation unit for releasing the holding of the movable unit MV by the lock member 34 of the support unit 30, and is able to be pressed in the rightward direction R.

As shown in FIG. 4, the operation button 13 includes a columnar operation element 131 with a flange exposed to the outside of the accommodation member 10, a block-shaped contact portion 132 fixed to a right end portion of the operation element 131, and a spring 133 as a second biasing member that biases the contact portion 132 and the operation element 131 in the leftward direction L. By pressing the operation element 131 in the rightward direction R, the contact portion 132 can be moved in the rightward direction R.

Figure 7:
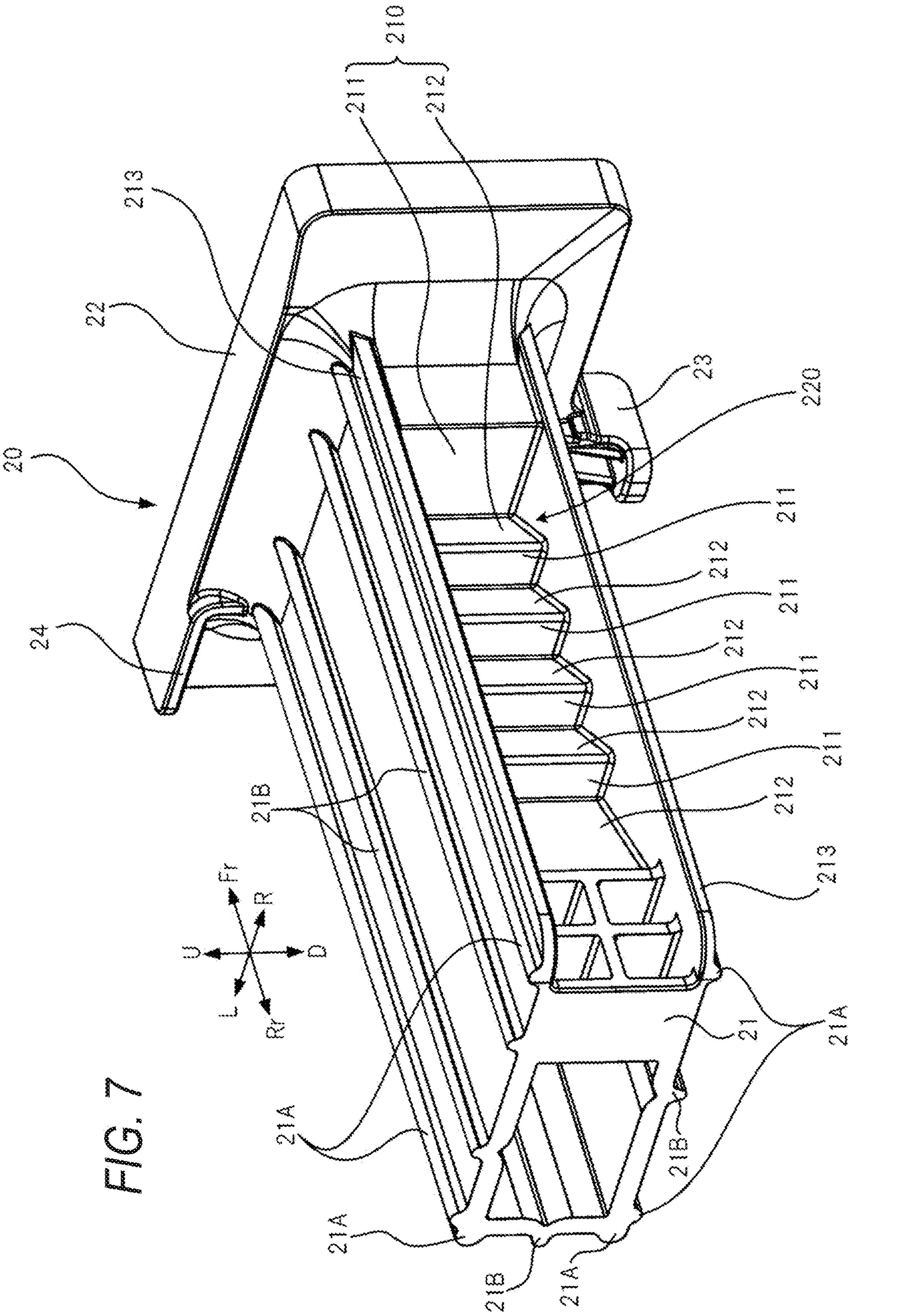
FIG. 7 is a perspective view of the central guide member 20.

FIG. 7 is a perspective view of the central guide member 20. The main body portion 21 of the central guide member 20 is provided, on a right side surface thereof, with an engagement surface portion 220 in which a plurality of engagement surfaces 210 that engage with the lock members 34 included in the support unit 30 are provided side by side in the front-rear direction, and a pair of wall portions 213 that are erected toward the lock member 34 (rightward direction R) from both ends of the engagement surface portion 220 in the up-down direction.

In the example of FIG. 7, five engagement surfaces 210 are arranged in the front-rear direction in the engagement surface portion 220. Each of the engagement surfaces 210 includes a vertical surface 211 that rises in the rightward direction R from the main body portion 21 and is substantially perpendicular to the front-rear direction, and an inclined surface 212 that rises obliquely from a proximal edge of the vertical surface 211 toward the rightward direction R and the rearward direction Rr. A leading edge of the inclined surface 212 and a leading edge of the vertical surface 211 next to the inclined surface 212 are connected to each other by, for example, a curved surface.

The wall portion 213 has a plate shape that rises in the rightward direction R from the main body portion 21 and is substantially perpendicular to the up-down direction. A projecting length of the wall portion 213 from the main body portion 21 is equal to or longer than a projecting length of the engagement surface 210 from the main body portion 21. That is, when viewed in the up-down direction in which the pair of wall portions 213 are arranged, the entire engagement surface portion 220 is covered with the wall portions 213.

Linear projection portions 21A each having a curved surface extending in the front-rear direction and linear projection portions 21B each having a curved surface and extending in the front-rear direction are provided on an upper surface, a left surface, and a lower surface of the main body portion 21. As shown in FIG. 6, six projection portions 21A are provided at four corners of the main body portion 21 when viewed in the front-rear direction. Two projection portions 21B are provided between the projection portions 21A on the upper surface, one projection portion 21B is provided between the projection portions 21A on the left surface, and one projection portion 21B is provided between the projection portions 21A on the lower surface. The projection portions 21A and the projection portions 21B each have a circular arc shape in cross section, and have different curvatures. Specifically, a curvature of the projection portion 21B is larger than a curvature of the projection portion 21A.

By providing the projection portions 21A and the projection portions 21B in the central guide member 20, a contact area between the central guide member 20 and an inner wall surface of the central guide hole 31C of the support unit 30 can be reduced to lower the sliding resistance, and the movable unit MV can be smoothly moved. Since the curvature of the projection portion 21A and the curvature of the projection portion 21B are different from each other, for example, the projection portion 21A having a small curvature can function for load transmission from the central guide member 20 to the support unit 30, and the projection portion 21B having a large curvature can function for sliding between the central guide member 20 and the central guide hole 31C. Thus, the smooth movement of the central guide member 20 and the efficient transmission of the load from the movable unit MV to the support unit 30 can be achieved by a plurality of types of projection portions (projection portions 21A and projection portions 21B).

As shown in FIG. 4, linear second projection portions 11Ra each having a curved surface and extending in the front-rear direction are provided on an upper surface, a lower surface, a right surface, and a left surface of the right guide member 11R. Linear second projection portions 11La each having a curved surface and extending in the front-rear direction are provided on an upper surface, a lower surface, a right surface, and a left surface of the left guide member 11L.

Since the right guide member 11R and the left guide member 11L are provided with the second projection portions 11Ra and the second projection portions 11La, contact areas between the right guide member 11R and the left guide member 11L and inner wall surfaces of the right guide hole 31R and the left guide hole 31L can be reduced to lower the sliding resistance, and the movable unit MV can be smoothly moved.

<Support Unit>

Figure 8:
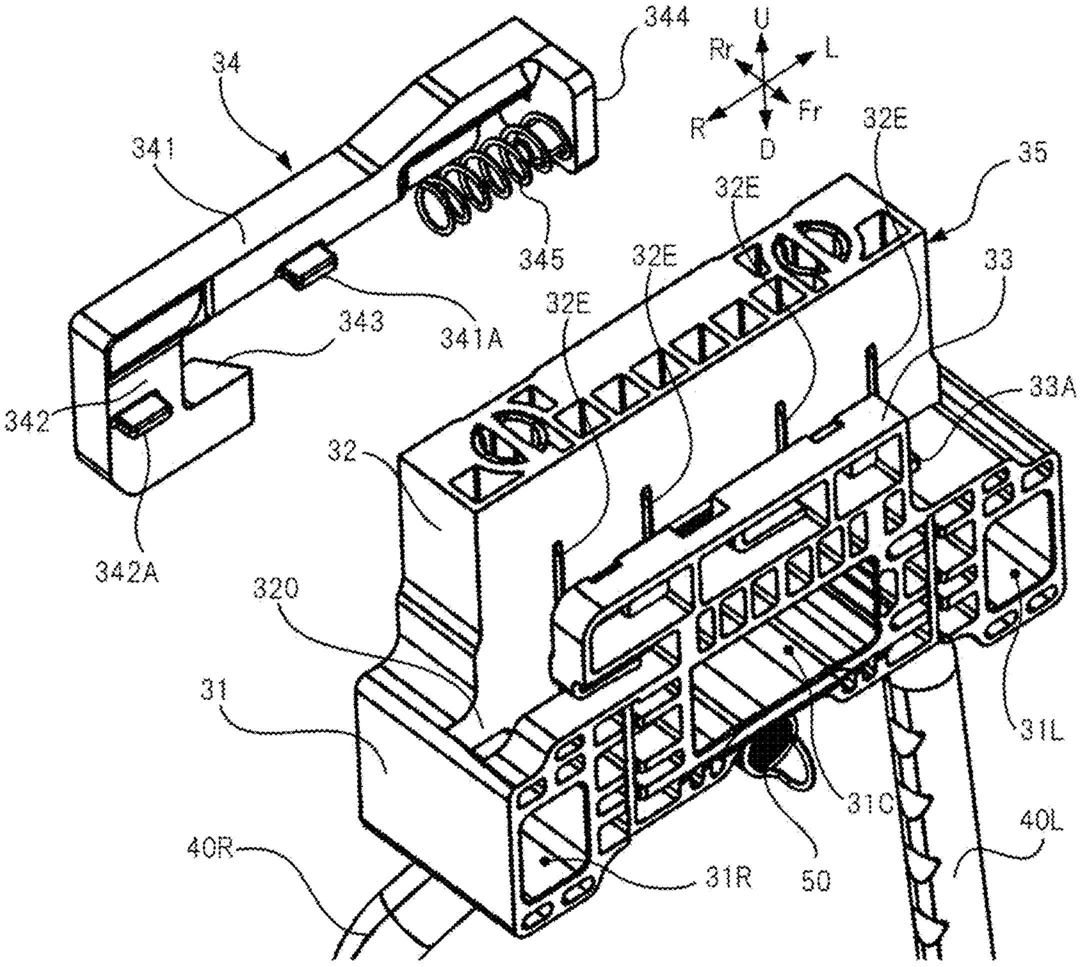
FIG. 8 is an exploded perspective view of a support unit 30.

FIG. 8 is an exploded perspective view of the support unit 30. The support unit 30 includes the lock member 34 that allows the movable unit MV to be held at a plurality of positions in the front-rear direction, a lock support member 35 that supports the lock member 34 which is allowed to be moved in the left-right direction, and the right stay 40R and the left stay 40L that support the lock support member 35.

(Lock Member)

The lock member 34 includes a rectangular columnar first portion 341 that extends in the left-right direction, a second portion 342 that extends in the downward direction D from a right end portion of the first portion 341, an engagement end 343 that extends in the leftward direction L from a lower end portion of the second portion 342, a flat plate portion 344 that extends in the frontward direction Fr and the downward direction D from a left end portion of the first portion 341 and whose thickness direction coincides with the left-right direction, and a coil spring 345 as a first biasing member that has one end fixed to a right surface of the flat plate portion 344.

The engagement end 343 is engageable with the engagement surface portion 220 of the central guide member 20, and has a shape in which a tip end having a width in the front-rear direction narrowed toward the tip end is pointed. The other end of the coil spring 345 is fixed to a left end surface of the front wall portion 33 to be described later, and biases the lock member 34 in the leftward direction L opposite to a pressing direction (rightward direction R) of the operation button 13.

The contact portion 132 of the operation button 13 is disposed to face a left side of the flat plate portion 344. When the operation element 131 of the operation button 13 is pressed in the rightward direction R, the contact portion 132 comes into contact with the flat plate portion 344 and presses the flat plate portion 344 in the rightward direction R. As a result, the lock member 34 moves in the rightward direction R. When the pressing of the operation button 13 is released, the lock member 34 moves in the leftward direction L by a biasing force of the coil spring 345 and returns to an original initial position. The flat plate portion 344 constitutes a contact portion that is contactable with the contact portion 132 of the operation button 13.

A plate-like locking piece 341A whose thickness direction coincides with the up-down direction is provided to protrude from a front surface of the first portion 341. A plate-like locking piece 342A whose thickness direction coincides with the up-down direction is provided to protrude from a front surface of the second portion 342.

(Lock Support Member)

Figure 9:
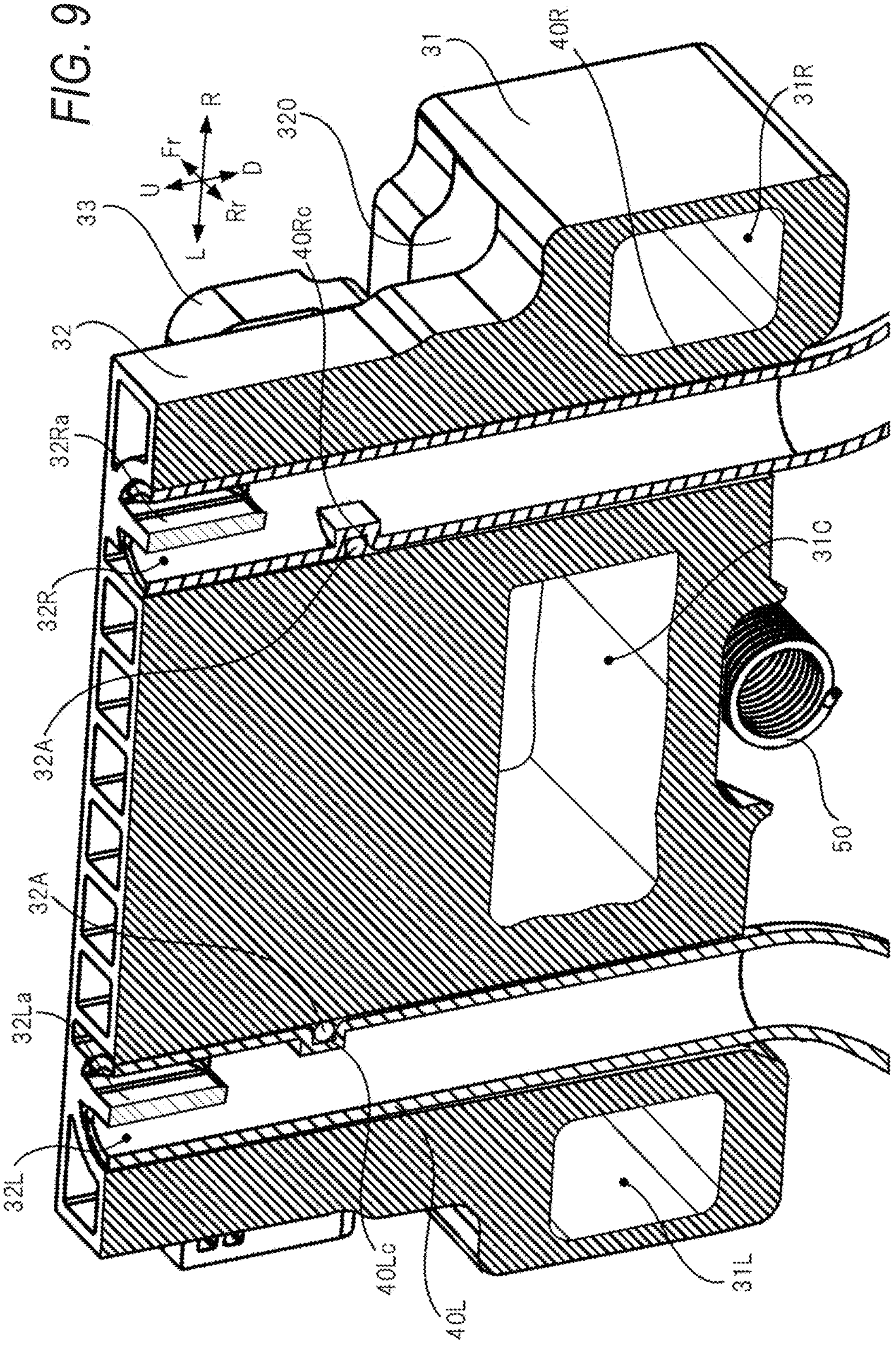
FIG. 9 is a schematic view of a cross section passing through axes of a right stay 40R and a left stay 40L of the support unit 30.
Figure 10:
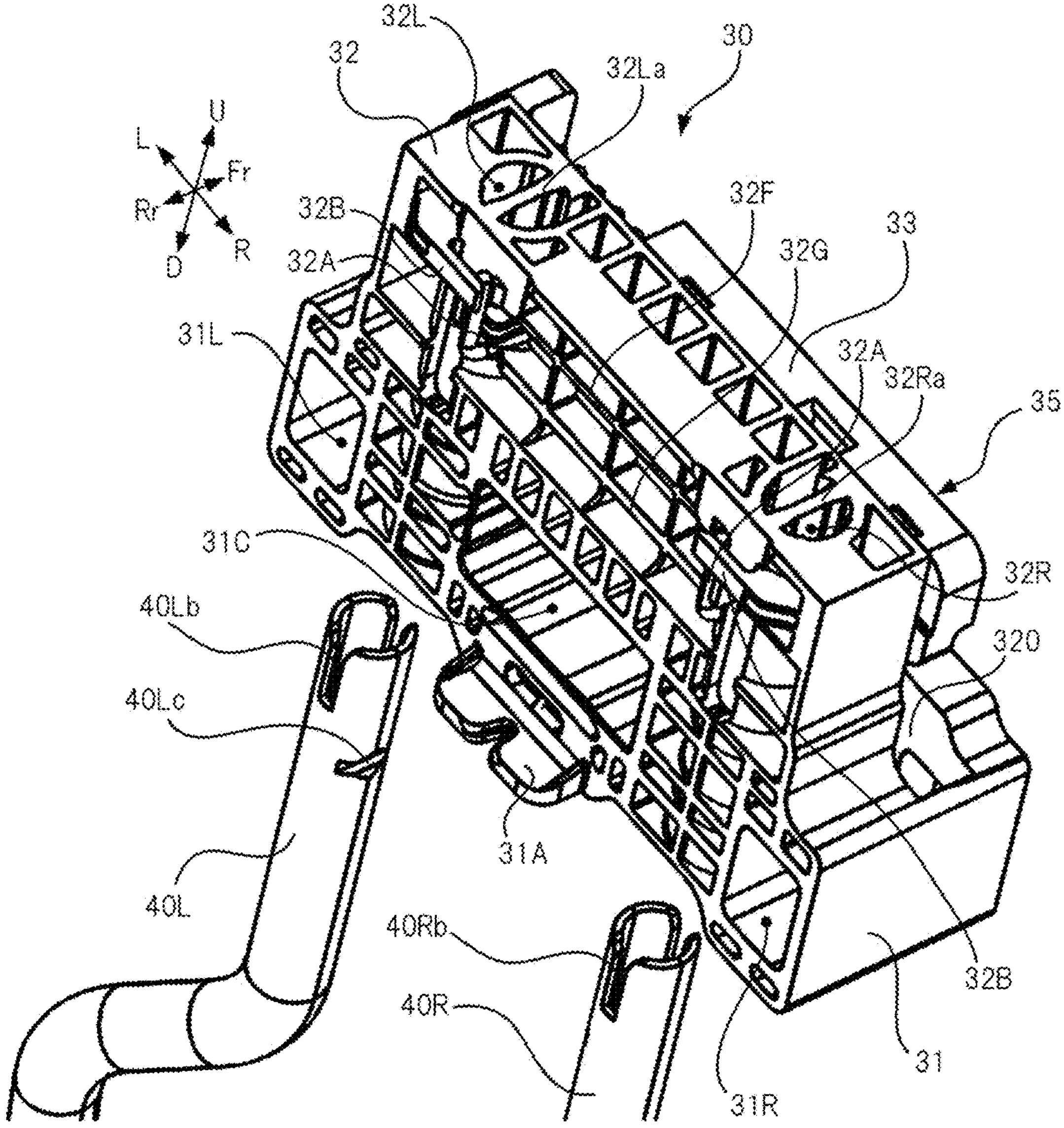
FIG. 10 is an exploded perspective view showing a state where the right stay 40R and the left stay 40L are removed from a lock support member 35.
Figure 11:
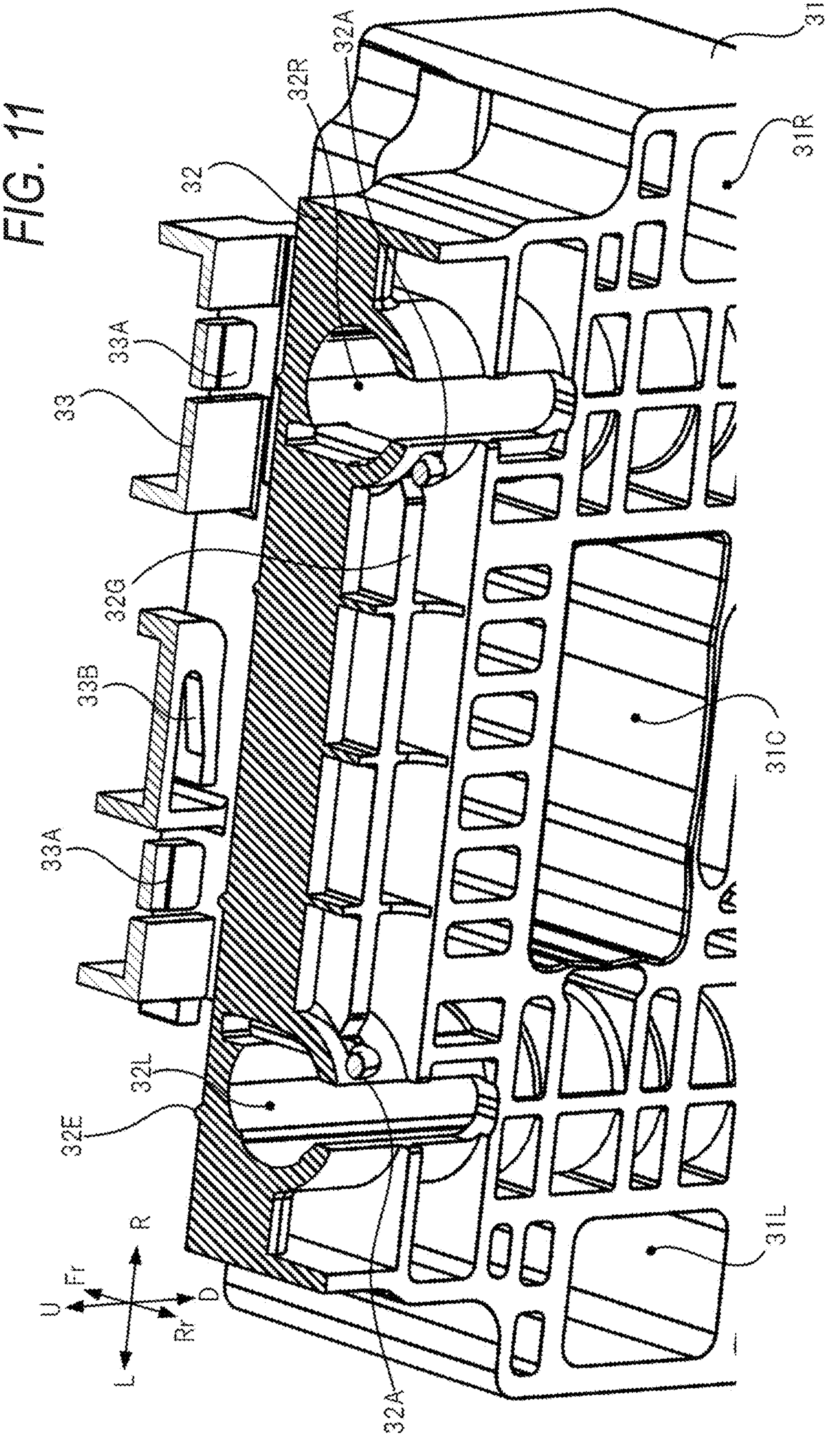
FIG. 11 is a schematic view of a cross section perpendicular to an up-down direction of the lock support member 35 shown in FIG. 10.
Figure 12:
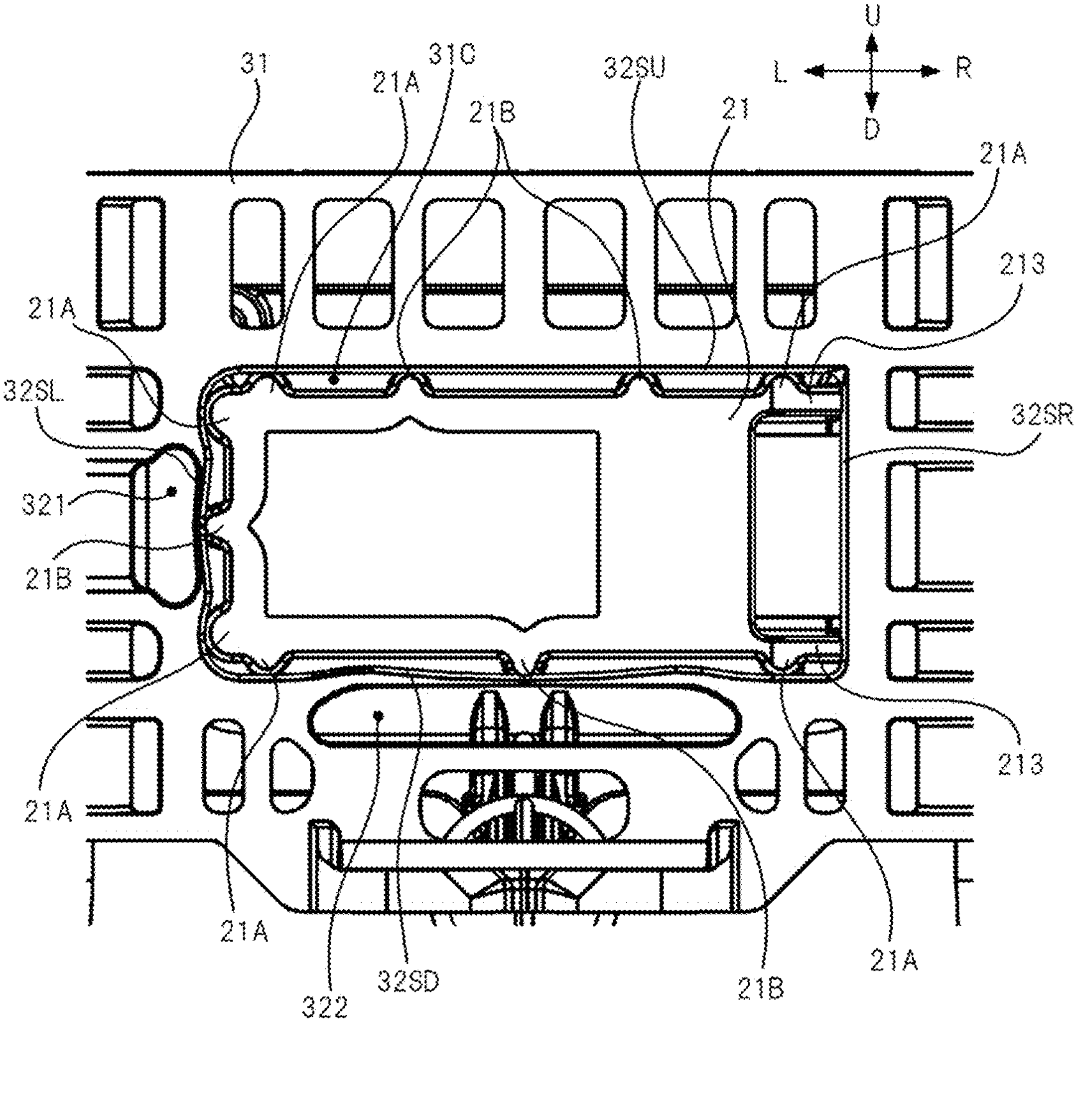
FIG. 12 is a partially enlarged view of the head rest 100 with a rear cover 12 removed when viewed from the rear side.
Figure 13:
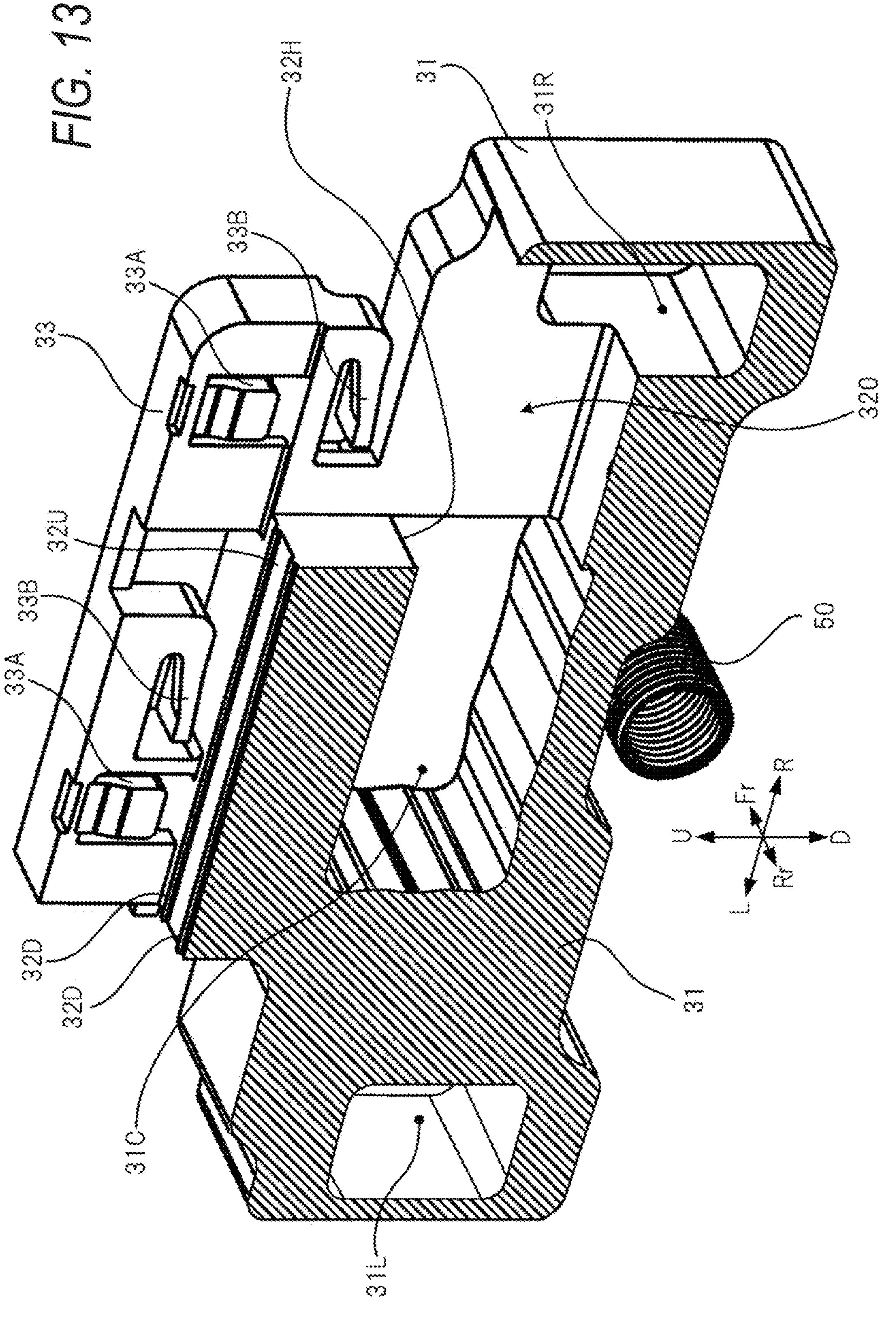
FIG. 13 is a schematic cross-sectional view when a position of the cross section in FIG. 9 is set between a rear wall portion 32 and a front wall portion 33.

FIG. 9 is a schematic view of a cross section passing through axes of the right stay 40R and the left stay 40L of the support unit 30. FIG. 10 is an exploded perspective view showing a state where the right stay 40R and the left stay 40L are removed from the lock support member 35. FIG. 11 is a schematic view of a cross section perpendicular to an up-down direction of the lock support member 35 shown in FIG. 10. FIG. 12 is a partially enlarged view of the head rest 100 with the rear cover 12 removed when viewed from the rear side. FIG. 13 is a schematic cross-sectional view when a position of the cross section in FIG. 9 is set between the rear wall portion 32 and the front wall portion 33. FIG. 14 shows a cross section perpendicular to an up-down direction of the head rest 100, and is a schematic view of a cross section passing through an axis of the central guide member 20. The hatched regions in FIGS. 9, 11, 13, and 14 are simplified as in FIG. 5.

As shown in FIG. 8, the lock support member 35 includes a substantially rectangular shaped base 31 that extends in the left-right direction, a plate-shaped rear wall portion 32 that is erected in the upward direction U from a rear end portion of the base 31 and whose thickness direction coincides with the front-rear direction, and a front wall portion 33 that is erected in the upward direction U from a front end portion of the base 31.

As shown in FIGS. 9 and 13, the base 31 is provided with three holes penetrating in the front-rear direction. Specifically, the base 31 is provided with a central guide hole 31C through which the main body portion 21 of the central guide member 20 is slidably inserted to guide the movement of the movable unit MV in the front-rear direction, a right guide hole 31R through which the right guide member 11R is slidably inserted to guide the movement of the movable unit MV in the front-rear direction, and a left guide hole 31L through which the left guide member 11L is slidably inserted to guide the movement of the movable unit MV in the front-rear direction. As shown in FIG. 12, the projection portions 21A and the projection portions 21B of the central guide member 20 are in sliding contact with the inner wall surface of the central guide hole 31C. The central guide hole 31C constitutes a first guide hole, and the right guide hole 31R and the left guide hole 31L constitute a second guide hole.

As shown in FIG. 9, the base 31 and the rear wall portion 32 are provided with a first insertion hole 32R which penetrates in the up-down direction and through which the right stay 40R is inserted, and a second insertion hole 32L which penetrates in the up-down direction and through which the left stay 40L is inserted. In the first insertion hole 32R, a dividing wall portion 32Ra that divides an inside space of the first insertion hole 32R in a radial direction of the hole is provided at an end portion at an opposite side to a seat back side, that is, at an upper end portion. In the second insertion hole 32L, a dividing wall portion 32La that divides an inside space of the second insertion hole 32L in a radial direction of the hole is provided at an upper end portion. The dividing wall portion 32Ra divides the upper end portion of the first insertion hole 32R into two portions in the left-right direction. The dividing wall portion 32La divides the upper end portion of the second insertion hole 32L into two portions in the left-right direction.

As shown in FIG. 10, the right stay 40R is formed in a pipe shape, and notches 40Rb are provided in front and rear surfaces of an upper end portion of the right stay 40R. The left stay 40L is formed in a pipe shape, and notches 40Lb are provided in front and rear surfaces of an upper end portion of the left stay 40L. Since the notches 40Rb and the dividing wall portion 32Ra are fitted to each other, and the notches 40Lb and the dividing wall portion 32La are fitted to each other, the lock support member 35 is supported by the right stay 40R and the left stay 40L. The lock support member 35 is restricted from rotating about an axis extending in the up-down direction by the dividing wall portion 32Ra and the dividing wall portion 32La.

Thus, the right stay 40R and the left stay 40L can be individually fixed to the lock support member 35 by fitting the dividing wall portion 32Ra and the dividing wall portion 32La and the notches 40Rb and the notches 40Lb. Therefore, a position between the two stays can be maintained utilizing the rigidity of the lock support member 35 without connecting the upper end portions of the right stay 40R and the left stay 40L using separate members. As a result, the manufacturing cost of the head rest 100 can be reduced without requiring a welding operation or the like for connecting the right stay 40R and the left stay 40L. Even in products in which an interval between the right stay 40R and the left stay 40L is different, the stay can be made common, and the manufacturing cost of the head rest 100 can be reduced.

As shown in FIGS. 9 and 10, a recessed portion 40Lc extending in the front-rear direction is provided on a right side surface in the vicinity of the upper end portion of the left stay 40L. A recessed portion 40Rc extending in the front-rear direction is provided on a left side surface in the vicinity of the upper end portion of the right stay 40R. As shown in FIG. 10, L-shaped metal pins 32A inserted into the recessed portion 40Lc and the recessed portion 40Rc are provided at positions corresponding to the recessed portion 40Lc and the recessed portion 40Rc in the rear wall portion 32. Ends of the pins 32A are held by holding portions 32B provided on a rear surface of the rear wall portion 32, and other ends are inserted into the recessed portion 40Lc and the recessed portion 40Rc.

By inserting the pins 32A into the recessed portion 40Lc and the recessed portion 40Rc, the right stay 40R and the left stay 40L are restricted from moving in the downward direction D with respect to the lock support member 35, so that the removal of the lock support member 35 from the right stay 40R and the left stay 40L can be prevented. Each pin 32A is an example of a restriction member that restricts movements of the right stay 40R and the left stay 40L in an axial direction.

As shown in FIG. 10, a plurality of ribs (two ribs, that is, a rib 32F and a rib 32G in the shown example) extending in the left-right direction are provided between the right stay 40R and the left stay 40L as viewed in the front-rear direction on the rear surface of the rear wall portion 32. As shown in FIG. 11, the rib 32G is provided adjacent to a portion of the pin 32A inserted into the recessed portion 40Rc and a portion of the pin 32A inserted into the recessed portion 40Lc in the left-right direction. The rib 32G is configured to have a larger width in the up-down direction than the rib 32F.

In this way, since the width of the rib 32G is increased, the load can be transmitted in the order of the rib 32G, the pin 32A, the right stay 40R, and the left stay 40L when a rotational force about an axis extending in the up-down direction acts on the lock support member 35. By increasing the width of the rib 32G, durability can be ensured.

As shown in FIG. 12, a part of the inner wall surface of the central guide hole 31C of the base 31 is configured to be elastically deformed. In the example of FIG. 12, the inner wall surface of the central guide hole 31C includes an upper surface 32SU and a lower surface 32SD that are disposed to face each other in the up-down direction, and a right surface 32SR and a left surface 32SL that are disposed to face each other in the left-right direction. In this embodiment, only the lower surface 32SD of the upper surface 32SU and the lower surface 32SD is configured to be elastically deformed, and only the left surface 32SL of the right surface 32SR and the left surface 32SL is configured to be elastically deformed. The upper surface 32SU and the lower surface 32SD form a first surface, and the right surface 32SR and the left surface 32SL form a second surface.

The base 31 is provided with a through hole 322 penetrating in the front-rear direction next to a lower side of the lower surface 32SD. Due to the presence of the through hole 322, the lower surface 32SD is bent toward the through hole 322. The base 31 is provided with a through hole 321 penetrating in the front-rear direction adjacent to a left side of the left surface 32SL. Due to the presence of the through hole 321, the left surface 32SL is bent toward the through hole 321.

In this way, since the left surface 32SL and the lower surface 32SD are configured to be elastically deformed, an operation load when the central guide member 20 is moved with respect to the support unit 30 can be reduced, and the movement can be smoothly performed. In addition, rattling of the central guide member 20 during the movement can be prevented. Further, since the right surface 32SR facing the left surface 32SL is configured to be not elastically deformed, the central guide member 20 can be prevented from moving in the left-right direction. A load applied to the movable unit MV can be efficiently released to the base 31 by the right surface 32SR.

Further, since the upper surface 32SU facing the lower surface 32SD is configured to be not elastically deformed, the central guide member 20 can be prevented from moving in the up-down direction. The load applied to the movable unit MV can be efficiently released to the base 31 by the upper surface 32SU.

As shown in FIG. 13, an opening 32H for receiving the engagement end 343 of the lock member 34 between the rear wall portion 32 and the front wall portion 33 when viewed in the left-right direction is provided in a right side wall surface (side wall surface facing the central guide member 220 of the engagement surface member 20) of the central guide hole 31C. The opening 32H is provided at a position facing the engagement surface portion 220 of the central guide member 20 inserted into the central guide hole 31C. The base 31 is provided with a recessed portion 320 which is connected to the opening 32H and the right guide hole 31R on a right side of the central guide hole 31C in a region between the rear wall portion 32 and the front wall portion 33 when viewed in the up-down direction.

In an upper portion 32U of the central guide hole 31C of the base 31, at least one (two in the example of FIG. 13) linear projection portion 32D having a curved surface is provided to extend in the left-right direction. A cross-sectional shape of the surface of the projection portion 32D is, for example, an arc shape. The first portion 341 of the lock member 34 is disposed on the upper portion 32U and is in sliding contact with the projection portion 32D.

The second portion 342 and the engagement end 343 of the lock member 34 are disposed in the recessed portion 320. In a state where the operation button 13 is not pressed, the engagement end 343 is held in a state of entering the central guide hole 31C from the opening 32H by the biasing force of the coil spring 345. The engagement surface portion 220 is disposed to face the opening 32H. Therefore, as shown in FIG. 14, the engagement end 343 that has entered the central guide hole 31C from the opening 32H can be engaged with any one of the engagement surfaces 210 of the engagement surface portion 220.

As shown in FIG. 14, a distal end portion of the engagement end 343 of the lock member 34 is shaped to mesh with each engagement surface 210 of the engagement surface portion 220. The engagement surface portion 220 and the engagement end 343 constitute a so-called ratchet mechanism. As will be described in detail later, the ratchet mechanism allows the movable unit MV to be manually moved in the frontward direction Fr without operating the operation button 13. On the other hand, when the movable unit MV is moved in the rearward direction Rr, the operation of the operation button 13 is required.

As shown in FIG. 13, first elastic portions 33A allowed to be elastically displaced in the front-rear direction are provided on a surface of the front wall portion 33 facing the lock member 34 to be spaced apart in the left-right direction. Each first elastic portion 33A is accommodated in a through hole penetrating the front wall portion 33 in the front-rear direction, and has a plate shape extending downward from an upper side of the through hole. The first elastic portion 33A has elasticity in which a state where a surface of the first elastic portion 33A facing the lock member 34 slightly protrudes rearward from a rear end surface of the front wall portion 33 is a steady state, and is configured to come into contact with the first portion 341 of the lock member 34.

Since the first elastic portion 33A and the first portion 341 are in contact with each other, the first portion 341 is sandwiched in the front-rear direction by the rear wall portion 32 and the front wall portion 33, and thus is firmly supported by the lock support member 35. Even when there is a manufacturing variation in the lock support member 35 and the lock member 34, the manufacturing variation can be absorbed by the deformation of the first elastic portions 33A. When the operation button 13 is pressed and the lock member 34 moves in the left-right direction, the deformation of the first elastic portions 33A can prevent this movement from being hindered. Further, when the lock member 34 moves in the left-right direction, the sliding resistance between the lock member 34 and the lock support member 35 can be reduced by the projection portions 32D. Therefore, the lock member 34 can be smoothly moved. Further, since the plurality of projection portions 32D are provided, dust among the projection portions 32D can be guided, and an increase in sliding resistance due to dust can be prevented.

Further, second elastic portions 33B allowed to be elastically displaced in the up-down direction are provided on the front wall portion 33 to be spaced apart in the up-down direction. Each second elastic portion 33B is accommodated in a through hole penetrating the front wall portion 33 in the front-rear direction, and is implemented by a claw having an L shape when viewed in the front-rear direction and extending in the downward direction D and the leftward direction L from an upper side of the through hole.

The locking piece 341A and the locking piece 342A of the lock member 34 are inserted into gaps between the second elastic portions 33B and the base 31. The second elastic portions 33B have elasticity such that a state of biasing the locking piece 341A and the locking piece 342A downward is a steady state. In the lock member 34, the locking piece 341A and the locking piece 342A are sandwiched in the up-down direction between the second elastic portions 33B and the base 31. Therefore, the lock support member 35 is also stably supported in the up-down direction. Even when there is a manufacturing variation in the lock support member 35 and the lock member 34, the manufacturing variation can be absorbed by the deformation of the second elastic portions 33B. When the lock member 34 moves in the left-right direction, the deformation of the second elastic portions 33B can prevent this movement from being hindered.

As shown in FIG. 8, on a front surface of the rear wall portion 32, at a position facing the first portion 341 of the lock member 34, linear projection portions 32E each having a curved surface are provided to extend in the up-down direction (four in the example of FIG. 8). A cross-sectional shape of the surface of each projection portion 32E is, for example, an arc shape. The first portion 341 of the lock member 34 is in sliding contact with the projection portions 32E.

Further, when the lock member 34 moves in the left-right direction, the sliding resistance between the lock member 34 and the lock support member 35 can be reduced by the projection portions 32E. Therefore, the lock member 34 can be smoothly moved. Further, since the plurality of projection portions 32E are provided, dust among the projection portions 32E can be guided, and an increase in sliding resistance due to dust can be prevented. Even when there is a manufacturing variation in the lock support member 35 and the lock member 34, the manufacturing variation can be absorbed.

As shown in FIG. 10, a projection 31A extending in the rearward direction Rr is provided at the center in the left-right direction in a lower end portion of a rear surface of the base 31. One end of the tension coil spring 50, which is an example of an elastic member, is fixed to the projection 31A. The other end of the tension coil spring 50 is fixed to the protrusion portion 23 of the central guide member 20. The tension coil spring 50 has a function of biasing the protrusion portion 23 toward the support unit 30.

Figure 15:
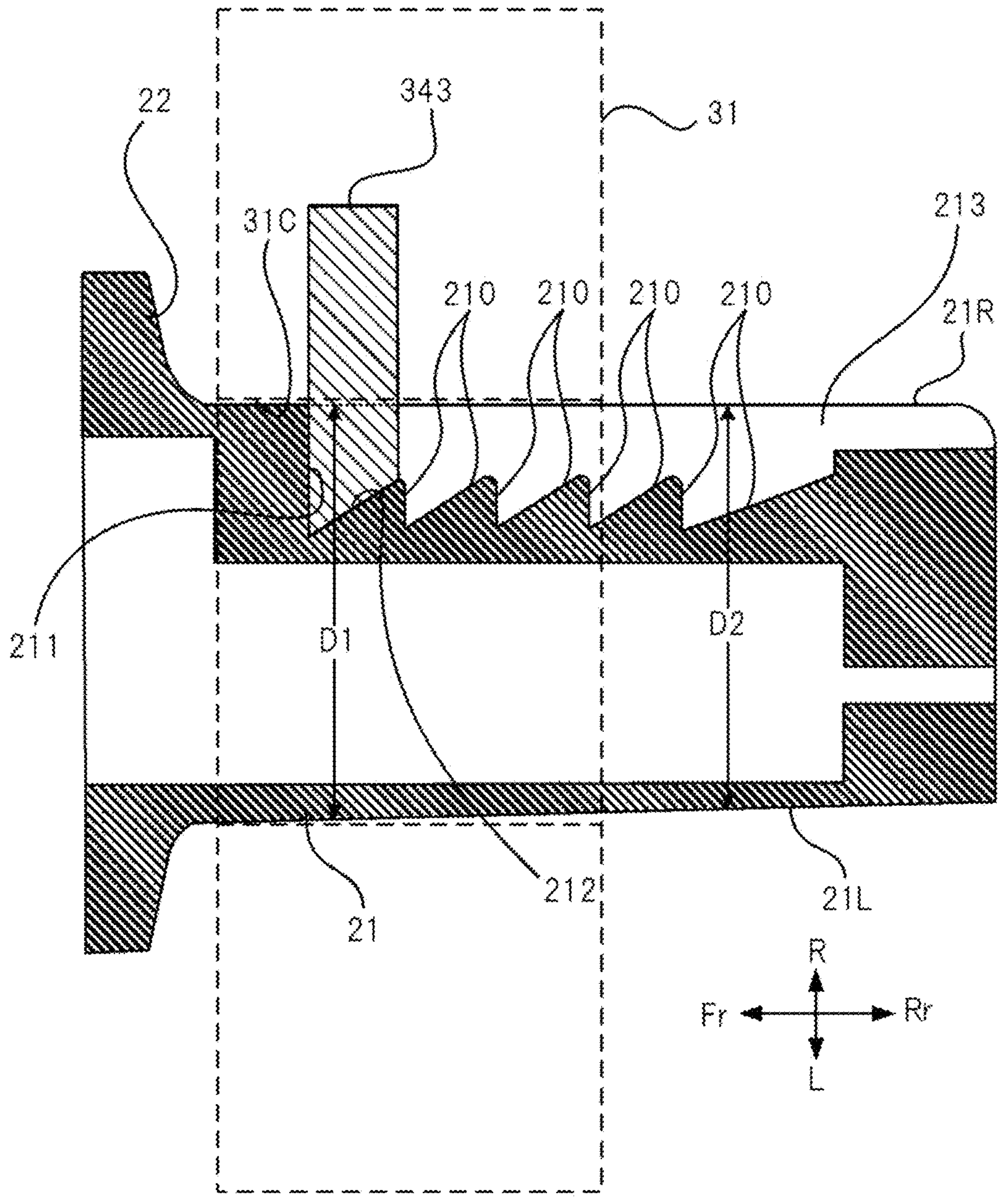
FIG. 15 shows a view in which only the central guide member 20 and an engagement end 343 are extracted, and is a cross section shown in FIG. 14 when viewed from above.

FIG. 15 shows a view in which only the central guide member 20 and the engagement end 343 are extracted, and is a cross section shown in FIG. 14 when viewed from above. In the head rest 100, as shown in FIGS. 14 and 15, an initial position of the movable unit MV is in a state where the engagement end 343 is engaged with the engagement surface 210 located closest to the front cover 11.

Figure 16:
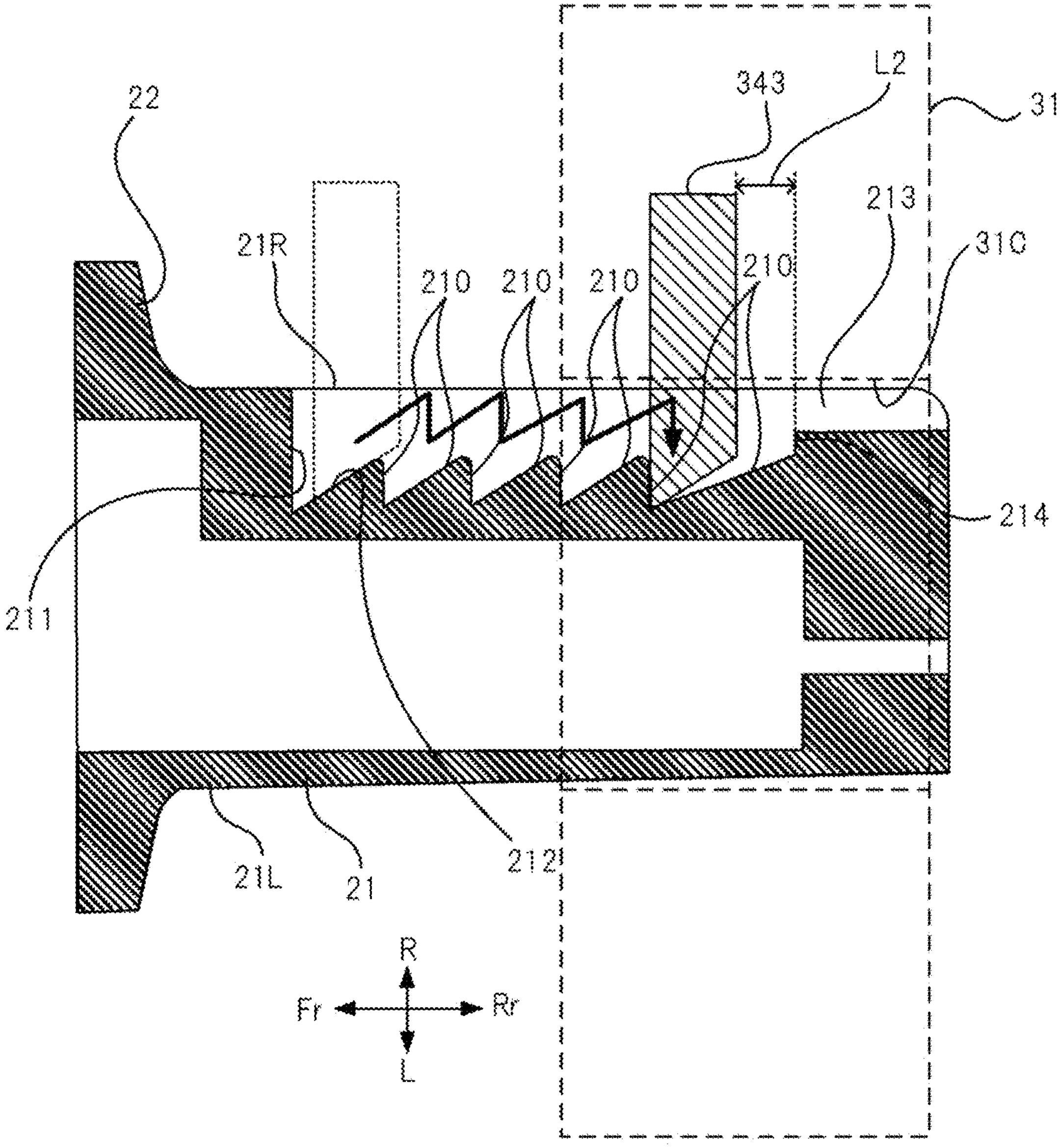
FIG. 16 is a view showing a state where a movable unit MV has moved to a foremost position from the state shown in FIG. 15.

When the movable unit MV is moved in the frontward direction Fr from the state shown in FIG. 15, the central guide member 20 moves in the frontward direction Fr, and the engagement end 343 is engaged with the engagement surface 210 located second closest to the front cover 11, and a position of the movable unit MV is held in a state of being moved in the frontward direction Fr by one step. When the movable unit MV is further moved in the frontward direction Fr from this state, the engagement surfaces 210 engaging with the engagement end 343 sequentially move forward. As shown in FIG. 16, when the engagement end 343 engages with the engagement surface 210 closest to the rear cover 12, the further movement of the movable unit MV in the frontward direction Fr is disabled. As shown in FIG. 16, a foremost position of the movable unit MV is in a state in which the engagement end 343 is engaged with the engagement surface 210 located closest to the rear cover 12. Thus, the head rest 100 can hold the movable unit MV at five positions in the front-rear direction.

The central guide member 20 is provided with the pair of wall portions 213 to sandwich the engagement end 343 in the up-down direction. By providing the wall portions 213, the relative movement of the engagement end 343 with respect to the engagement surface portion 220 in the front-rear direction can be guided. Even when the movable unit MV is located at any position in a movable range, the engagement end 343 is sandwiched between the pair of wall portions 213 in the up-down direction, so that the movable unit MV can be prevented from moving in the up-down direction. Therefore, the movable unit MV can be stably held at a desired position.

In the central guide member 20, a right edge 21R of the main body portion 21 is parallel to the front-rear direction, whereas a left edge 21L of the main body portion 21 is inclined with respect to the front-rear direction. In other words, a width of the main body portion 21 of the central guide member 20 in the left-right direction becomes smaller at a position farther from the flange portion 22. As a result, a width D1 (see FIG. 15) in the left-right direction of a region provided with the engagement surface 210 located closest to the front cover 11 in the central guide member 20 is different from a width D2 (see FIG. 15) in the left-right direction of a region provided with the engagement surface 210 located closest to the rear cover 12 in the central guide member 20, and the width D2 is smaller than the width D1.

According to such a configuration, when the movable unit MV is moved in the frontward direction Fr from the state shown in FIG. 15, a gap in the left-right direction between the central guide hole 31C and the main body portion 21 is reduced. Therefore, the sliding resistance against the base 31 when the movable unit MV is moved in the frontward direction Fr increases, and a large force is required to move the movable unit MV. On the other hand, when the movable unit MV moves in the frontward direction Fr sequentially from the state shown in FIG. 15, the sliding resistance gradually decreases. Therefore, the required force for moving the movable unit MV decreases. On the other hand, as described below, when the movable unit MV moves sequentially in the frontward direction Fr, a tensile load of the tension coil spring 50 increases. Therefore, even when the movable unit MV is moved to any position, the movable unit MV can be moved with the same force.

Figure 17:
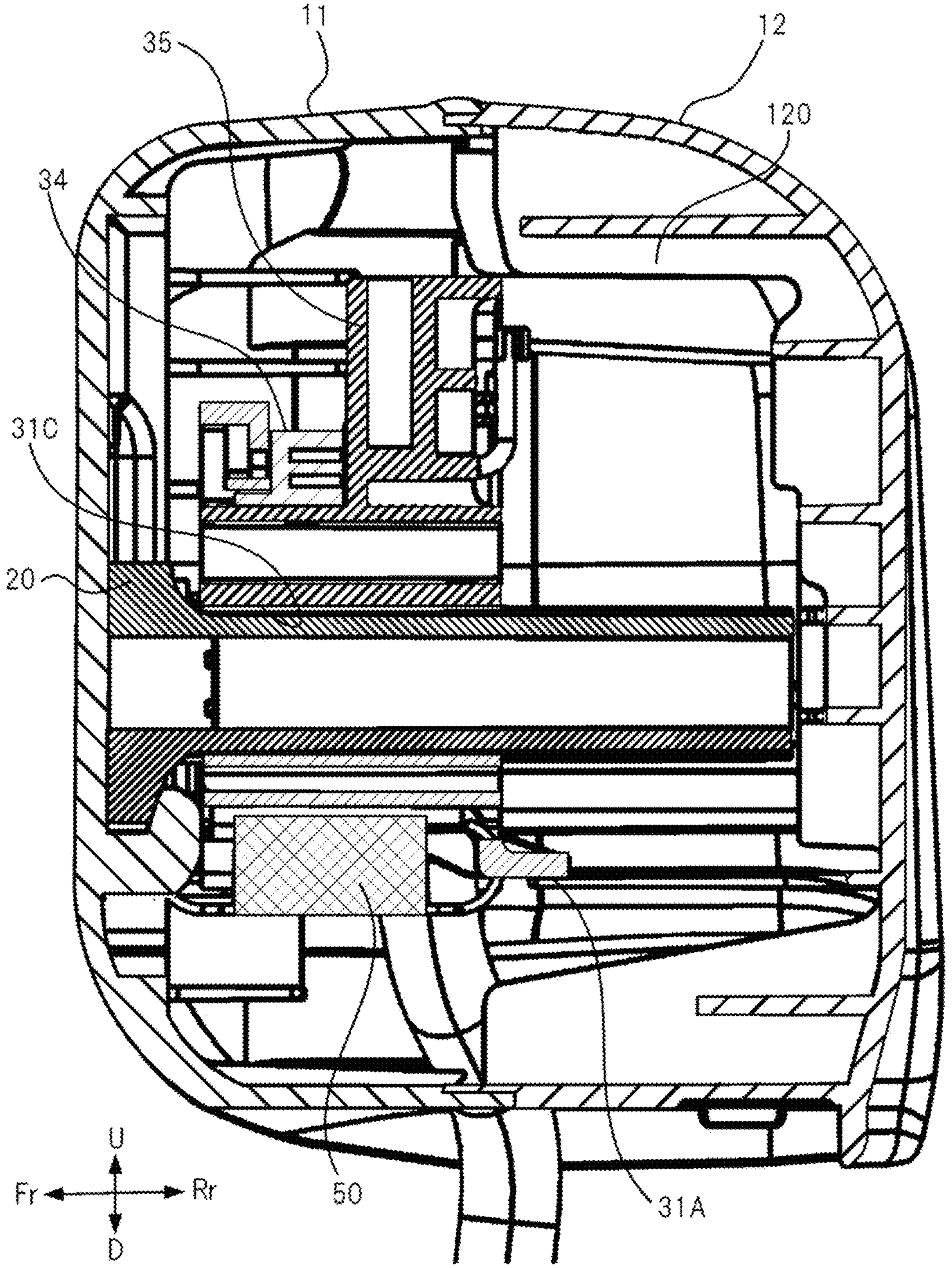
FIG. 17 is a schematic view of a cross section perpendicular to a left-right direction of the head rest 100 and passing through an axis of the central guide member 20, and is a view showing a state where the movable unit MV is at an initial position.
Figure 18:
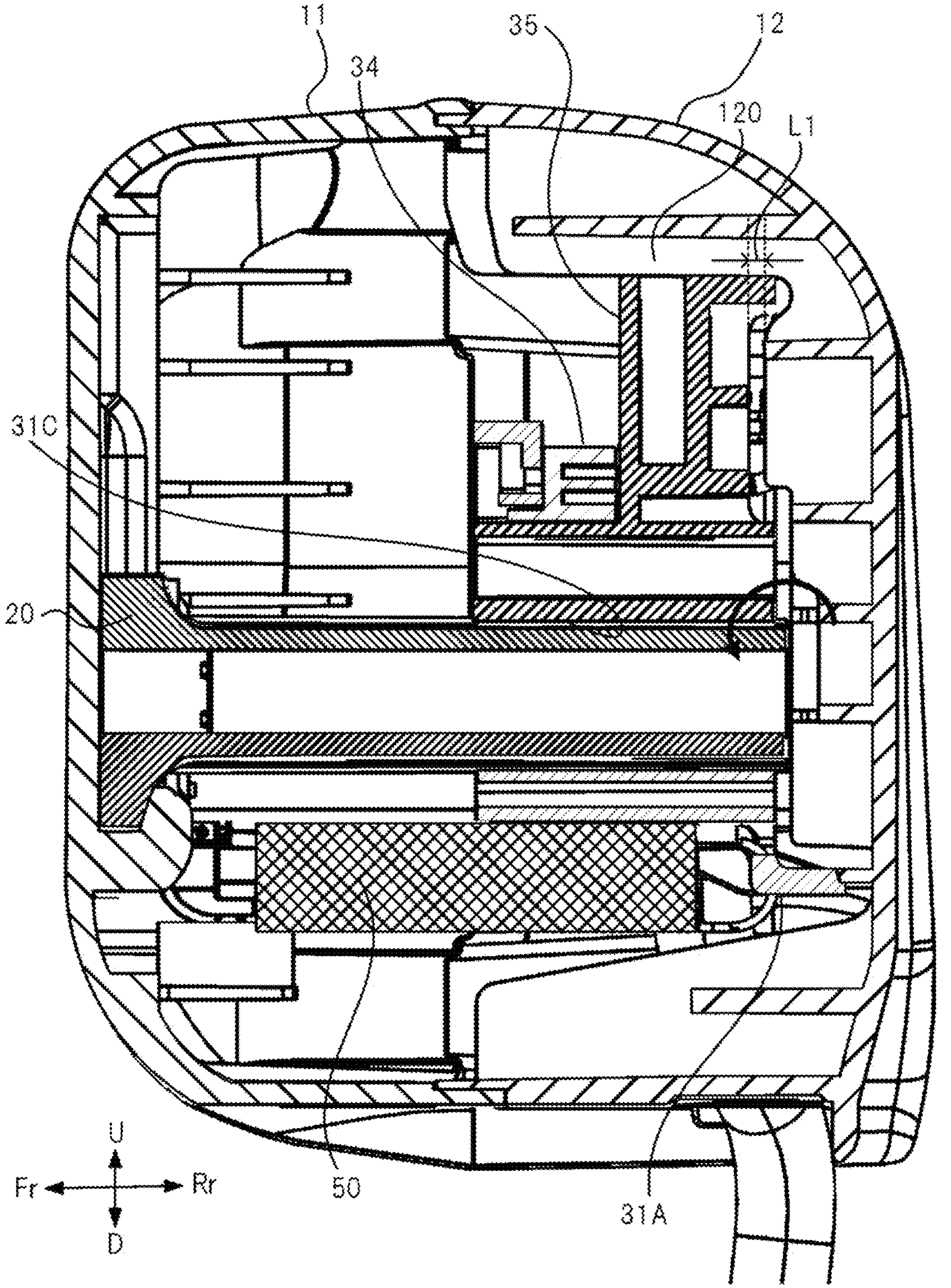
FIG. 18 is a schematic view of a cross section perpendicular to the left-right direction of the head rest 100 and passing through the axis of the central guide member 20, and is a view showing a state where the movable unit MV is at a foremost position.

Next, a state of the tension coil spring 50 when the movable unit MV moves will be described with reference to FIGS. 17 and 18. FIGS. 17 and 18 are schematic views of a cross section perpendicular to the left-right direction of the head rest 100 and passing through the axis of the central guide member 20. FIG. 17 shows a state where the movable unit MV is at the initial position, and FIG. 18 shows a state where the movable unit MV is at the foremost position.

As shown in FIG. 17, a length of the tension coil spring 50 in the front-rear direction is an initial value (minimum value) in a state where the movable unit MV is at the initial position. As the movable unit MV moves in the frontward direction Fr from the state shown in FIG. 17, the length of the tension coil spring 50 in the front-rear direction increases, and the tensile load of the tension coil spring 50 increases. When the movable unit MV is in the foremost position as shown in FIG. 18, the length of the tension coil spring 50 in the front-rear direction is a maximum value.

When the tension coil spring 50 extends from a state where the movable unit MV is at the initial position, as indicated by a black arrow in FIG. 18, a force acts on the movable unit MV to rotate in a counterclockwise direction about a rear end edge and an upper end edge of the central guide member 20. That is, a force for inclining in the frontward direction Fr acts on the movable unit MV. In this embodiment, a restriction rib 120 (see FIGS. 2, 17, and 18) for restricting the inclination of the movable unit MV in the frontward direction Fr due to this force is provided on an inner surface of the rear cover 12. The restriction rib 120 constitutes a restricting portion. As shown in FIG. 2, the restriction rib 120 has a plate shape extending in the front-rear direction in which a thickness direction coincides with the left-right direction. In the example of FIG. 2, three restriction ribs 120 are provided side by side in the left-right direction at an upper end portion of the rear cover 12 and a center portion in the left-right direction.

As shown in FIG. 17, in a state where the movable unit MV is at the initial position, the restriction rib 120 is not located above the support unit 30, and the support unit 30 cannot be brought into contact with the restriction rib 120. When the movable unit MV moves in the frontward direction Fr from the state shown in FIG. 17, the support unit 30 and the restriction rib 120 overlap when viewed in the up-down direction, and a gap between the support unit 30 and the restriction rib 120 is small.

In this embodiment, for example, in a movement range of the movable unit MV from a state where the engagement end 343 is engaged with the engagement surface 210 located second closest to the front cover 11 to a state where the movable unit MV is at the foremost position, the support unit 30 and the restriction rib 120 overlap in the up-down direction. In this movement range, since an extension amount of the tension coil spring 50 is large, the movable unit MV is likely to rotate. However, in this movement range, as shown in FIG. 18, the upper end edge of the support unit 30 comes into contact with the restriction rib 120, thereby restricting the inclination of the movable unit MV in the frontward direction Fr.

In this way, even when a length of the tension coil spring 50 in the front-rear direction is equal to or greater than a threshold value THL (length in a state where the engagement end 343 is engaged with the engagement surface 210 located second closest to the front cover 11), and the attitude of the movable unit MV with respect to the support unit 30 becomes unstable, the inclination of the movable unit MV in the frontward direction Fr with respect to the support unit 30 is restricted by the contact between the restriction rib 120 and the support unit 30. Therefore, when the movable unit MV is located at any position in its movable range, the attitude of the movable unit MV can be stabilized.

When the length of the tension coil spring 50 in the front-rear direction is less than the threshold value THL, the restriction rib 120 and the support unit 30 are not in contact with each other, so that the movable unit MV can be smoothly moved. On the other hand, when the length of the tension coil spring 50 in the front-rear direction is equal to or greater than the threshold value THL, the support unit 30 may come into contact with the restriction rib 120 to resist the movement of the movable unit MV. However, in this case, since the tension of the tension coil spring 50 increases, a user does not feel the resistance. As a result, the movable unit MV can be smoothly moved in the entire movable range.

FIG. 18 shows a shortest distance L1 in the front-rear direction between the support unit 30 and the rear cover 12 when the movable unit MV is at the foremost position. FIG. 16 shows a distance L2 between a closest portion 214 of the main body portion 21 at the shortest distance in the rearward direction Rr with respect to the engagement end 343 and the engagement end 343. The distance L2 is preferably larger than the shortest distance L1.

With this configuration, when a load is applied to the rear cover 12 from the outside, the rear cover 12 collides with the support unit 30 before the closest portion 214 of the main body portion 21 collides with the engagement end 343, so that the load can be concentrated on the support unit 30. Accordingly, the load is prevented from being transmitted to the lock member 34, and the position of the movable unit MV can be stably held even when an impact is applied. In addition, the durability of the lock member 34 can be enhanced.

Figure 19:
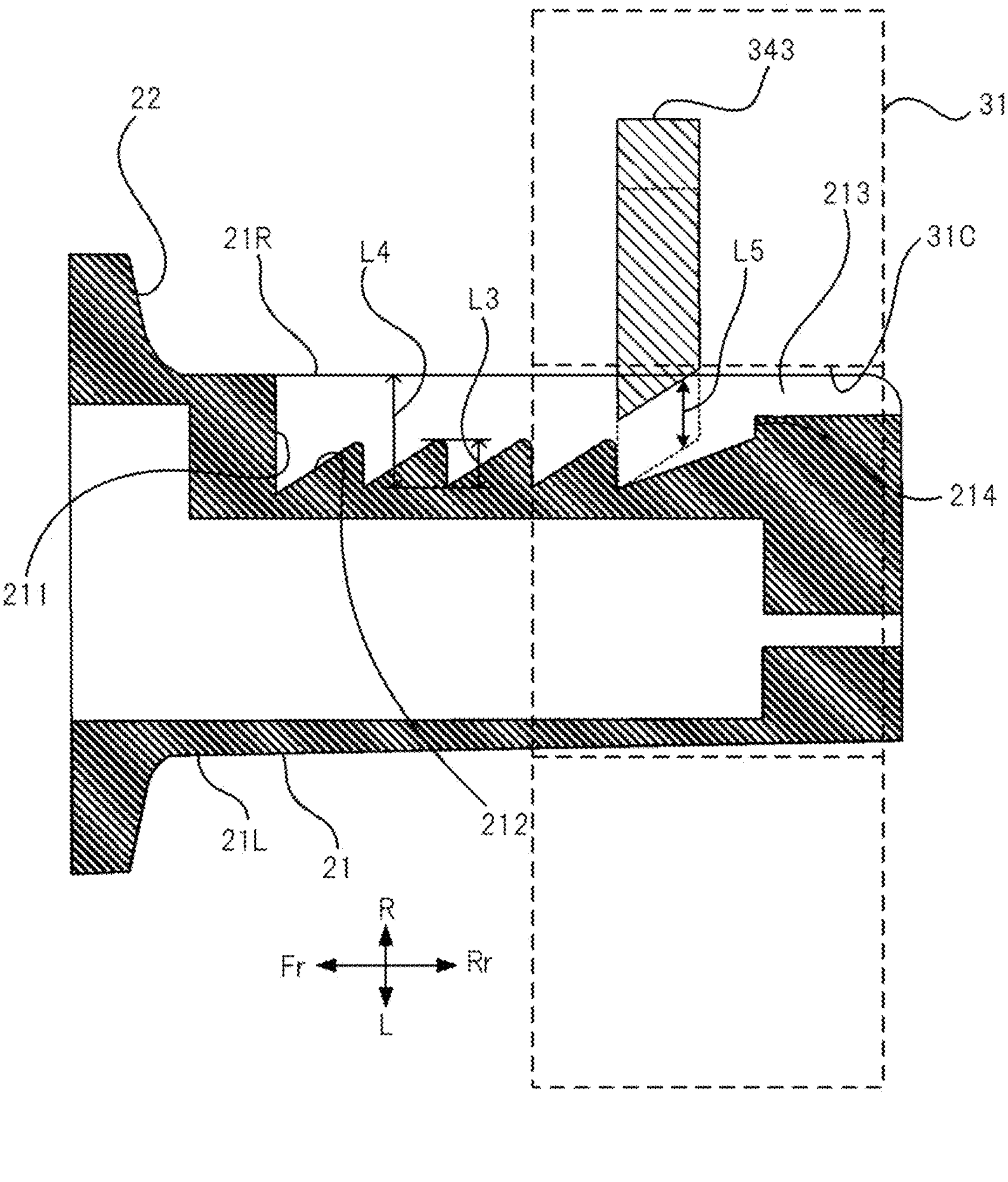
FIG. 19 is a view showing a state where the operation button 13 is pressed in a rightward direction R in the state shown in FIG. 16.

In the head rest 100, when the movable unit MV is moved in the frontward direction Fr, the operation of the operation button 13 is not required. On the other hand, when the movable unit MV is moved in the rearward direction Rr, the operation of the operation button 13 is required. FIG. 19 is a view showing a state where the operation button 13 is pressed in the rightward direction R in the state shown in FIG. 16.

When the operation button 13 is pressed, the engagement end 343 moves in the rightward direction R by a maximum distance L5. In this state, since the holding of the position of the movable unit MV by the lock member 34 is released, the movable unit MV can be moved in the rearward direction Rr.

The maximum distance L5 is larger than a protrusion height L3 in the left-right direction of the vertical surfaces 211 of the other engagement surfaces 210 excluding the engagement surface 210 located closest to the front cover 11. The maximum distance L5 is preferably less than a protrusion height L4 of the wall portion 213 in the rightward direction R.

By setting the maximum distance L5 to be less than the protrusion height L4, even when the operation button 13 is operated, the engagement end 343 can be sandwiched between the pair of wall portions 213 in the up-down direction, so that the relative movement of the engagement end 343 with respect to the movable unit MV can be stably performed. Thus, even when the movable unit MV is moved in the rearward direction Rr, the movable unit MV can be stably moved.

A protrusion height of the vertical surface 211 of the engagement surface 210 located closest to the front cover 11 in the rightward direction R is preferably sufficiently larger than the maximum distance L5. Thus, even when the operation button 13 is pressed in the state shown in FIG. 15, the central guide member 20 can be prevented from moving in the rearward direction Rr.

Figure 20:
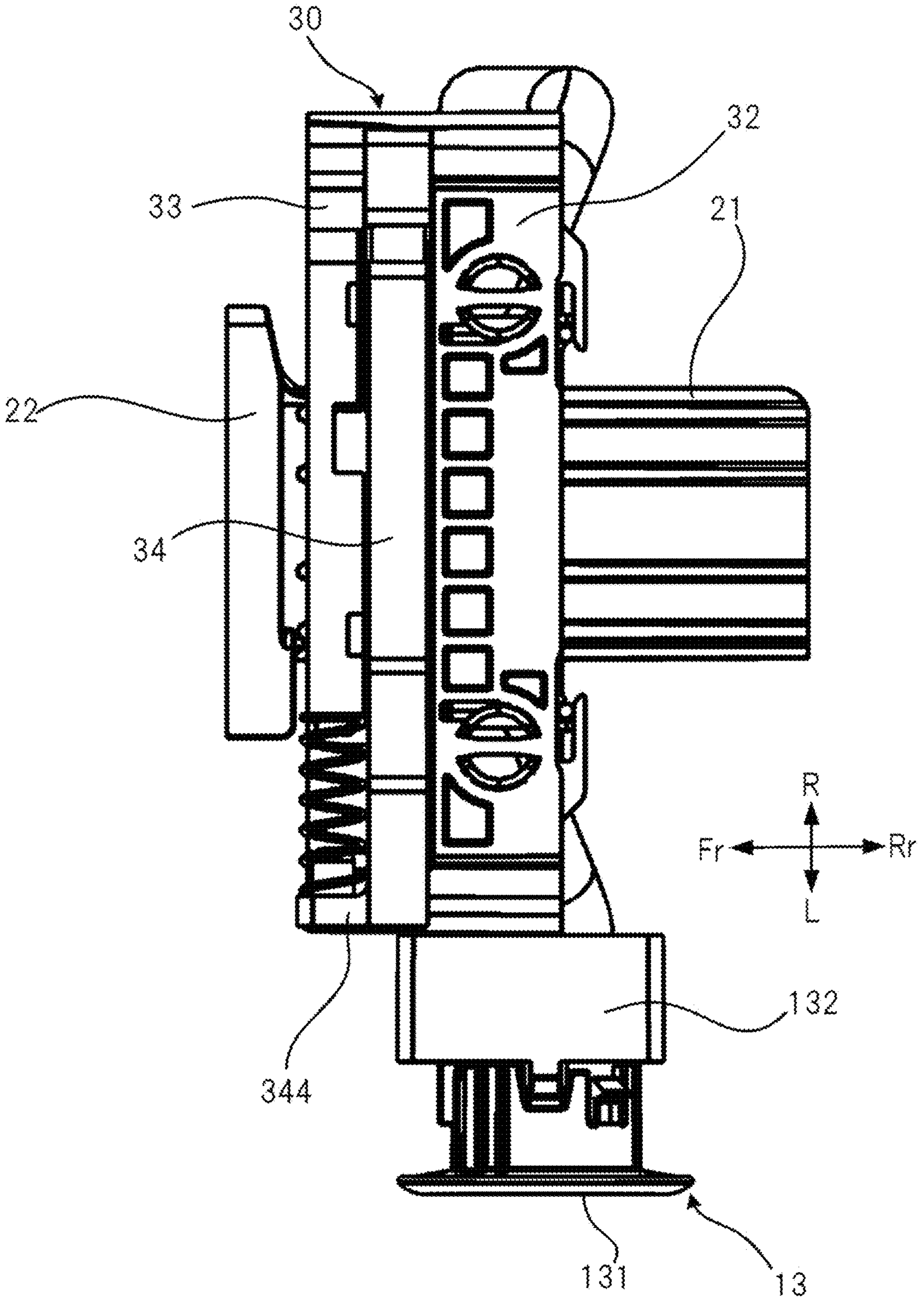
FIG. 20 is a view showing the operation button 13, the central guide member 20, and the support unit 30 in the head rest 100 in an extracted manner, and is a view showing a state where the movable unit MV is at the initial position when viewed from above.
Figure 21:
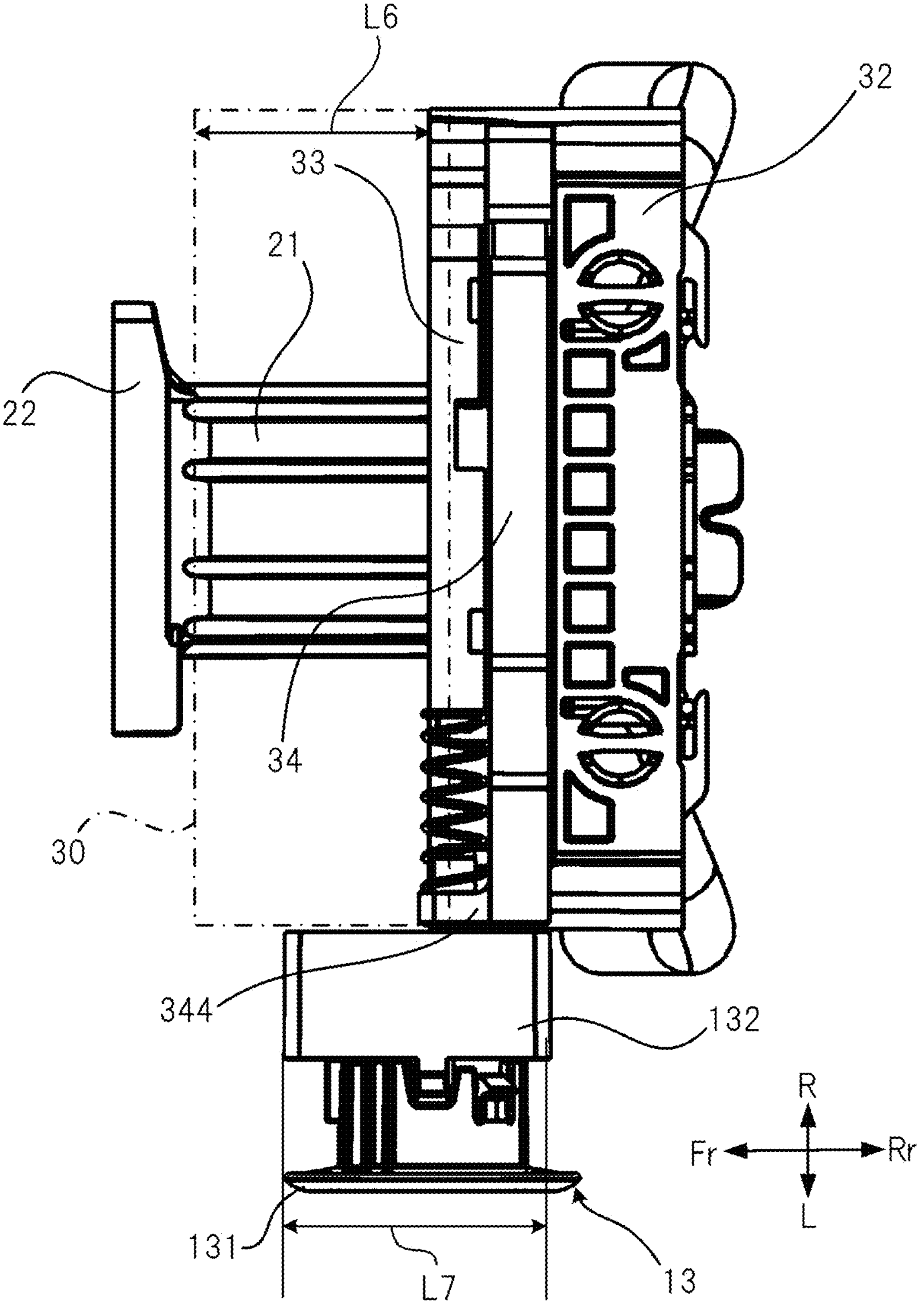
FIG. 21 is a view showing the operation button 13, the central guide member 20, and the support unit 30 in the head rest 100 in an extracted manner, and is a view showing a state where the movable unit MV is at the foremost position when viewed from above.

FIG. 20 is a view showing the operation button 13, the central guide member 20, and the support unit 30 in the head rest 100 in an extracted manner, and is a view showing a state where the movable unit MV is at the initial position when viewed from above. FIG. 21 is a view showing the operation button 13, the central guide member 20, and the support unit 30 in the head rest 100 in an extracted manner, and is a view showing a state where the movable unit MV is at the foremost position when viewed from above. In FIG. 21, a position of the support unit 30 in a state where the movable unit MV is at the initial position is indicated by an imaginary line.

As shown in FIG. 21, the central guide member 20 is movable in the front-rear direction by a distance L6. A width of the contact portion 132 of the operation button 13 in the front-rear direction is a distance L7. The distance L7 is equal to or greater than the distance L6.

According to such a configuration, as shown in FIGS. 20 and 21, even when the movable unit MV is located at any position in the movable range, the contact portion 132 and the flat plate portion 344 may overlap in the left-right direction. Therefore, the holding of the position of the movable unit MV can be released by pressing the lock member 34 regardless of the position of the movable unit MV. Thus, since a structure of the operation button 13 can be simplified, the manufacturing cost of the head rest 100 can be reduced.

Figure 22:
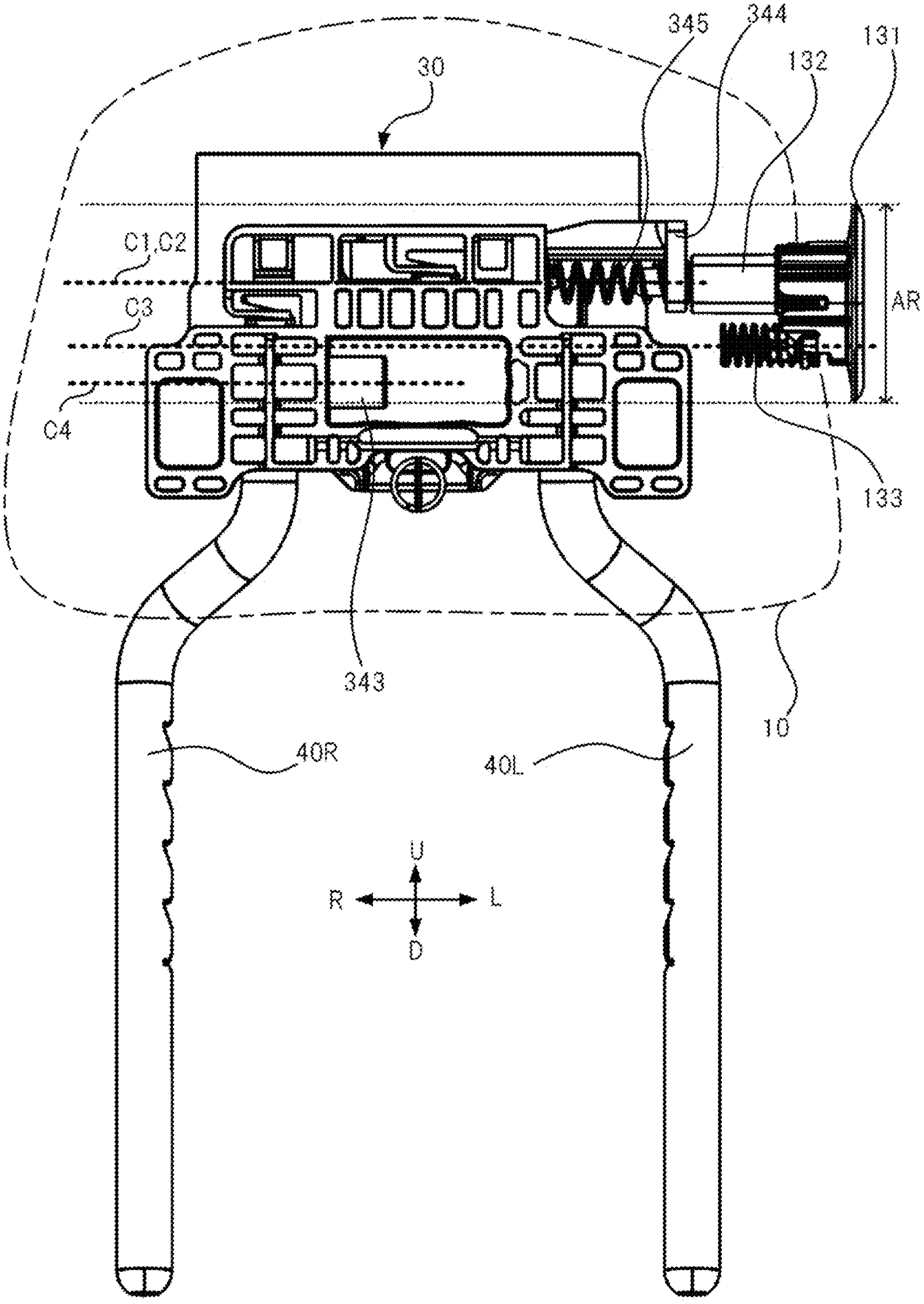
FIG. 22 is a schematic view illustrating a preferable arrangement of the operation button 13 and a lock member 34, and is a view showing the head rest 100 when viewed from the front side.

FIG. 22 is a schematic view illustrating a preferable arrangement of the operation button 13 and the lock member 34, and is a view showing the head rest 100 when viewed from the front side. FIG. 22 illustrates a center line C1 in the up-down direction of the coil spring 345 that biases the lock member 34 in the leftward direction L and a center line C2 in the up-down direction of the contact portion 132. In the example of FIG. 22, the center line C1 and the center line C2 coincide with each other. FIG. 22 illustrates a center line C3 in the up-down direction of the spring 133 that biases the contact portion 132 and the operation element 131 in the leftward direction L. FIG. 22 illustrates a center line C4 of the engagement end 343 in the up-down direction. FIG. 22 illustrates a maximum width AR of the operation button 13 in the up-down direction. As illustrated in FIG. 22, the center line C1, the center line C2, the center line C3, and the center line C4 are all located between both ends of the maximum width AR. With such an arrangement, a space in the accommodation member 10 can be effectively used.

Although one aspect of the head rest 100 has been described above, the head rest 100 is not limited to the shown one, and can be appropriately changed within the scope of the technical idea of the present disclosure. For example, the central guide member 20 is detachably attached to the front cover 11, and may be integrally with the front cover 11. The central guide member 20 may be detachably attached to the rear cover 12 or integrally formed with the rear cover 12 instead of the front cover 11. In this case, the right guide member 11R and the left guide member 11L are also preferably provided on the rear cover 12.

The tension coil spring 50 is fixed to the protrusion portion 23 of the central guide member 20, and may be fixed to the front cover 11. Further, the tension coil spring 50 may be provided to connect the rear cover 12 and the projection 31A.

As described above, the following matters are disclosed in the present specification.

(1) A head rest including:

a stay supported by a seat back of a vehicle seat;

a support unit supported by the stay; and a movable unit configured to be allowed to move in a front-rear direction of the vehicle seat with respect to the support unit, in which the movable unit includes a first accommodation member and a second accommodation member that form a space for accommodating the support unit and are provided side by side in the front-rear direction, and a first guide member that is formed in a columnar shape extending in the front-rear direction from the first accommodation member or the second accommodation member in the space, the support unit has a first guide hole through which the first guide member is slidably inserted to guide a movement of the movable unit in the front-rear direction, and a part of an inner wall surface of the first guide hole is configured to be elastically deformed.

According to (1), an operation load when the movable unit is moved with respect to the support unit can be reduced, and the movement can be smoothly performed. In addition, rattling of the first guide member during the movement of the movable unit can be prevented.

(2) The head rest according to (1), in which the inner wall surface of the first guide hole includes a pair of first surfaces disposed to face each other in a cross direction intersecting the front-rear direction, and a pair of second surfaces disposed to face each other in a direction intersecting the cross direction and the front-rear direction, and one of the pair of first surfaces and one of the pair of second surfaces are configured to be elastically deformed.

According to (2), the first guide member can be effectively prevented from moving in a plane perpendicular to the front-rear direction.

(3) The head rest according to (1) or (2), in which the support unit includes a lock member allowing the first guide member to be held at a plurality of positions in the front-rear direction, and a lock support member supporting the lock member allowed to be moved in a first direction intersecting the front-rear direction, and the lock support member includes an elastic portion that is in contact with a part of the lock member and is allowed to be elastically displaced in a direction intersecting the first direction.

According to (3), the lock member can be smoothly moved in the first direction while the lock member is stably supported.

(4) The head rest according to (3), in which the elastic portion includes a first elastic portion allowed to be elastically displaced in the front-rear direction, and a second elastic portion allowed to be elastically displaced in a direction intersecting the first direction and the front-rear direction.

According to (4), the lock member can be more smoothly moved in the first direction while the lock member is more stably supported.

(5) The head rest according to any one of (1) to (4), in which the support unit includes a lock member allowing the first guide member to be held at a plurality of positions in the front-rear direction, and a lock support member supporting the lock member allowed to be moved in a first direction intersecting the front-rear direction, and a linear projection portion in contact with the lock member is provided on a surface of the lock support member facing the lock member.

According to (5), the lock member can be smoothly moved by reducing the sliding resistance between the lock member and the lock support member when the lock member moves in the first direction. Further, since a plurality of linear projection portions are provided, dust among the projection portions can be guided, and an increase in sliding resistance due to dust can be prevented.

(6) The head rest according to any one of (1) to (5), in which the stay includes a first stay and a second stay, the support unit has a first insertion hole through which the first stay is inserted and a second insertion hole through which the second stay is inserted, each of the first insertion hole and the second insertion hole is provided with a dividing wall portion that divides an inside space of the hole in a radial direction at an end portion opposite to the seat back side, and each of the first stay and the second stay is provided with, on an end portion opposite to a side of the seat back, a notch that engages with the dividing wall portion.

According to (6), since the stay can be fixed to the support unit by the engagement of the dividing wall portion and the notch, positions of the two stays can be held using the rigidity of the support unit without connecting ends of the first stay and the second stay using separate members. As a result, a manufacturing cost of the head rest can be reduced without requiring a welding operation or the like for connecting the first stay and the second stay. Even in products in which an interval between the first stay and the second stay is different, components of the stay can be made common, and the manufacturing cost of the head rest can be reduced.

(7) The head rest according to (6), in which the support unit includes a plurality of ribs that are provided between the first stay and the second stay and extend in a direction in which the first stay and the second stay are arranged, and a restriction member that is provided adjacent to a specific rib, as viewed in the front-rear direction, which is one of the plurality of ribs and restricts movements of the first stay and the second stay in an axial direction, and the specific rib is configured to have a larger width than other ribs.

According to (7), a load can be transmitted in the order of the specific rib, the restriction member, and the stay in a case where a rotational force of the head rest about an axis extending in the up-down direction acts on the support unit. By increasing the width of the specific rib, durability can be ensured.

What is claimed is:

1. A head rest, comprising:

a stay supported by a seat back of a vehicle seat;

a support unit supported by the stay; and a movable unit configured to be allowed to move in a front-rear direction of the vehicle seat with respect to the support unit, wherein the movable unit includes a first accommodation member and a second accommodation member that form a space for accommodating the support unit and are provided side by side in the front-rear direction, and a first guide member that is formed in a columnar shape extending in the front-rear direction from the first accommodation member or the second accommodation member in the space, the support unit has a first guide hole through which the first guide member is slidably inserted to guide a movement of the movable unit in the front-rear direction, and a part of an inner wall surface of the first guide hole is configured to be elastically deformed, wherein the part of the inner wall surface of the first guide hole configured to be elastically deformed is formed integrally, as a single continuous piece, with the support unit.

2. The head rest according to claim 1, wherein the inner wall surface of the first guide hole includes a pair of first surfaces disposed to face each other in a cross direction intersecting the front-rear direction, and a pair of second surfaces disposed to face each other in a direction intersecting the cross direction and the front-rear direction, and one of the pair of first surfaces and one of the pair of second surfaces are configured to be elastically deformed.

3. The head rest according to claim 1, wherein the support unit includes a lock member allowing the first guide member to be held at a plurality of positions in the front-rear direction, and a lock support member supporting the lock member allowed to be moved in a first direction intersecting the front-rear direction, and a linear projection portion in contact with the lock member is provided on a surface of the lock support member facing the lock member.

4. The head rest according to claim 1, wherein the support unit includes a lock member allowing the first guide member to be held at a plurality of positions in the front-rear direction, and a lock support member supporting the lock member allowed to be moved in a first direction intersecting the front-rear direction, and the lock support member includes an elastic portion that is in contact with a part of the lock member and is allowed to be elastically displaced in a direction intersecting the first direction.

5. The head rest according to claim 4, wherein the elastic portion includes a first elastic portion allowed to be elastically displaced in the front-rear direction, and a second elastic portion allowed to be elastically displaced in a direction intersecting the first direction and the front-rear direction.

6. The head rest according to claim 1, wherein the stay includes a first stay and a second stay, the support unit has a first insertion hole through which the first stay is inserted and a second insertion hole through which the second stay is inserted, each of the first insertion hole and the second insertion hole is provided with a dividing wall portion that divides an inside space of the corresponding insertion hole in a radial direction at an end portion opposite to the seat back side, and each of the first stay and the second stay is provided with, on an end portion opposite to a side of the seat back, a notch that engages with the dividing wall portion.

7. The head rest according to claim 6, wherein the support unit includes a plurality of ribs that are provided between the first stay and the second stay and extend in a direction in which the first stay and the second stay are arranged, and a restriction member that is provided adjacent to a specific rib, as viewed in the front-rear direction, which is one of the plurality of ribs and restricts movements of the first stay and the second stay in an axial direction, and the specific rib is configured to have a larger width than other ribs.

* * * * *